US 12,465,862 B2

(12) United States Patent
Gardner et al.

(10) Patent No.: US 12,465,862 B2
(45) Date of Patent: Nov. 11, 2025

(54) SYSTEMS AND METHODS FOR CONTROLLING AN INTERACTIVE HYBRID ENVIRONMENT REPRESENTING A MOTORISED SPORTING EVENT AT A TRACK

(71) Applicant: I R Kinetics Limited, Earby (GB)

(72) Inventors: David Gardner, Poulton le Fylde (GB); Andrew Bradley, Settle (GB)

(73) Assignee: I R Kinetics Limited, Earby (GB)

( * ) Notice: Subject to any disclaimer, the term of this patent is extended or adjusted under 35 U.S.C. 154(b) by 402 days.

(21) Appl. No.: 17/919,978

(22) PCT Filed: Apr. 26, 2021

(86) PCT No.: PCT/GB2021/051008
§ 371 (c)(1),
(2) Date: Oct. 19, 2022

(87) PCT Pub. No.: WO2021/214496
PCT Pub. Date: Oct. 28, 2021

(65) Prior Publication Data
US 2023/0158409 A1    May 25, 2023

(30) Foreign Application Priority Data
Apr. 24, 2020 (GB) .................................. 2006084
Dec. 21, 2020 (GB) .................................. 2020297

(51) Int. Cl.
*A63F 13/803* (2014.01)
*A63F 13/31* (2014.01)
*A63F 13/352* (2014.01)

(52) U.S. Cl.
CPC ............ *A63F 13/803* (2014.09); *A63F 13/31* (2014.09); *A63F 13/352* (2014.09);
(Continued)

(58) Field of Classification Search
CPC ...... A63F 13/803; A63F 13/31; A63F 13/352; A63F 13/35; A63F 13/57; A63F 13/65;
(Continued)

(56) References Cited

U.S. PATENT DOCUMENTS 6,155,927 A    12/2000    Levasseur et al.
7,395,438 B2    7/2008    Parks et al.
(Continued)

FOREIGN PATENT DOCUMENTS

GB    2365360 A    2/2002
GB    2518602 B    10/2016
(Continued)

OTHER PUBLICATIONS

Canadian Intellectual Property Office, Office Action, Canadian Patent Application No. 3,176,114, Jan. 23, 2024, 3 pages.
(Continued)

*Primary Examiner* — James S. McClellan
(74) *Attorney, Agent, or Firm* — Fenwick & West LLP

(57) ABSTRACT

A computer implemented method of controlling an interactive hybrid environment representing a motorised sporting event at a track is described. The interactive hybrid environment includes representations of real and virtual vehicles on the track. The method comprises receiving a stream of real sensor data, the real sensor data comprises: real kinematic data of a real vehicle on the track, the real kinematic data being captured by infra-red sensors at the track, and real control data regarding the control of the real vehicle by a driver, the real control data being captured by vehicle sensors and obtained via telemetry systems from the real vehicle; determining the position and kinematic behaviour of the representation of the real vehicle within the interactive hybrid environment using the real kinematic data; using the real control data and the real kinematic data to create a black
(Continued)

box determination of the position of the real vehicle on the track based on the real control data; receiving a stream of computer-generated control data which is obtained by user interaction with a computer presenting the interactive hybrid environment to the user and capturing the user inputs to control kinematic behaviour the representation of the virtual vehicle; and determining the position and kinematic behaviour of the representation of the virtual vehicle within the interactive hybrid environment by using the black box determination and the computer-generated control data.

32 Claims, 21 Drawing Sheets

(52) U.S. Cl.
CPC . *A63F 2300/1031* (2013.01); *A63F 2300/105* (2013.01); *A63F 2300/535* (2013.01)

(58) Field of Classification Search
CPC ........ A63F 2300/1031; A63F 2300/105; A63F 2300/535
See application file for complete search history.

(56) References Cited

U.S. PATENT DOCUMENTS

| | | | |
|---|---|---|---|
| 9,251,603 B1* | 2/2016 | Kozko | G06T 15/20 |
| 2003/0151554 A1 | 8/2003 | McCarthy | |
| 2005/0280521 A1* | 12/2005 | Mizumaki | B60K 35/00 345/87 |
| 2007/0198939 A1* | 8/2007 | Gold | H04L 67/125 715/757 |
| 2009/0021394 A1* | 1/2009 | Coughlin | H04Q 9/00 340/870.07 |
| 2010/0271367 A1* | 10/2010 | Vaden | A63F 13/213 348/157 |
| 2012/0100911 A1 | 4/2012 | Rejen et al. | |
| 2017/0076553 A1 | 3/2017 | Washington et al. | |
| 2018/0304149 A1 | 10/2018 | Galasso et al. | |
| 2019/0344449 A1* | 11/2019 | Williams | B25J 9/1605 |

FOREIGN PATENT DOCUMENTS

| | | | |
|---|---|---|---|
| GB | 2585165 | A | 12/2020 |
| JP | H11-503046 | A | 3/1999 |
| JP | 2004-040772 | A | 2/2004 |
| JP | 2012-503513 | A | 2/2012 |
| WO | WO 00/67897 | A2 | 11/2000 |

OTHER PUBLICATIONS

The Eurasian Patent Organization, Eurasian Patent Office, Office Action, Mar. 16, 2023, 2 pages.
Saudi Authority for Intellectual Property, Examination Report and Written Opinion, Saudi Application No. 522440969, Sep. 1, 2023, 8 pages.
Canadian Intellectual Property Office, Office Action, CA Patent Application No. 3,176,114, Nov. 13, 2024, six pages.
Eurasian Patent Office, Office Action, EA Patent Application No. 202490855, Sep. 11, 2024, eight pages.
Japan Patent Office, Office Action, JP Patent Application No. 2022-564587, Oct. 22, 2024, seven pages.
Saudi Authority for Intellectual Property, Office Action, SA Patent Application No. 523451827, Oct. 20, 2024, 12 pages.
United Arab Emirates Patent Office, Office Action, UAE Patent Application No. P6002160/2022, Feb. 15, 2024, 12 pages.
PCT International Search Report and Written Opinion, PCT/GB2021/051008, Nov. 5, 2021, 17 Pages.
Korean Intellectual Property Office, Office Action, KR Patent Application No. 520220809754, Jun. 23, 2025, 32 pages.
Indian Intellectual Property Office, First Examination Report, IN Patent Application No. 202227060348, Jul. 2, 2025, seven pages.
Isreal Patent Office, Israeli Office Action, IL Patent Application No. 296834, Jul. 15, 2025, six pages.

\* cited by examiner

Figure 3a — Real Data from Live Event Data Capture Server

| Vehicle ID Data | Vehicle Orientation Data | Longitudinal Positional Data | Lateral Positional Data | Steering Position Data | Brake Position Data | Accelerator Position Data | Gear Select Position Data |
|---|---|---|---|---|---|---|---|
| 38 | 22, 52a | 22, 52b | 22, 52c | 26, 54a | 26, 54b | 26, 54c | 26, 54d |

28

Figure 3b — Virtual Race Commands from Gaming Computers

| Gaming Computer ID | Steering Position Data | Brake Position Data | Accelerator Position Data | Gear Select Position Data |
|---|---|---|---|---|
| 56 | 38, 58a | 38, 58b | 38, 58c | 38, 58d |

38

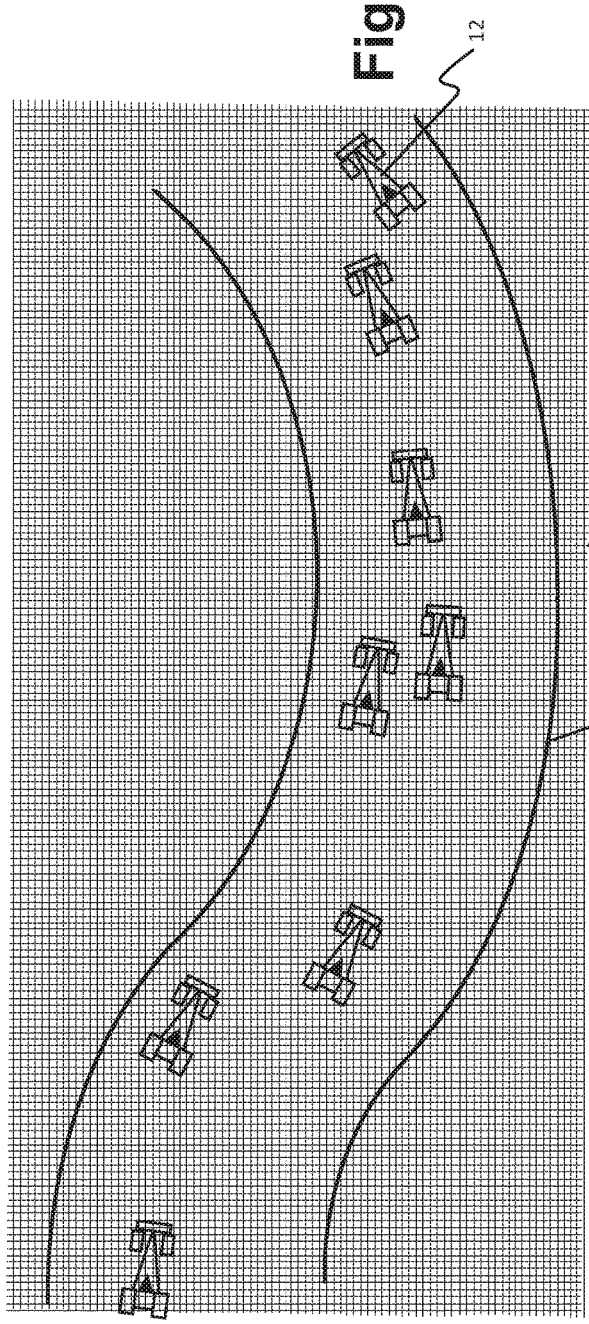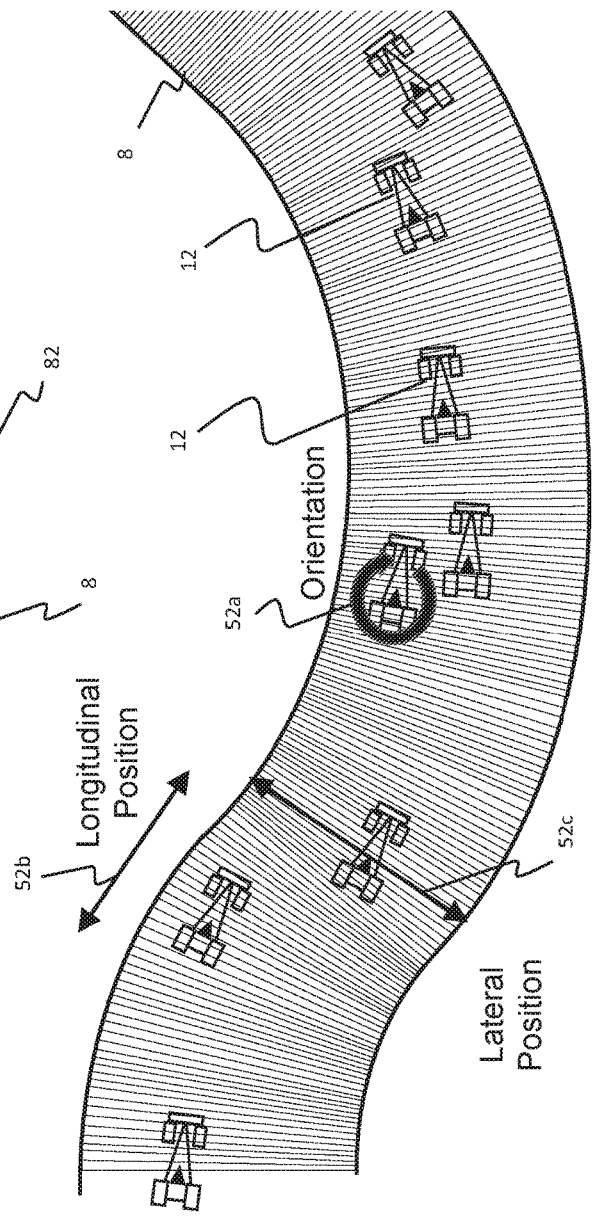

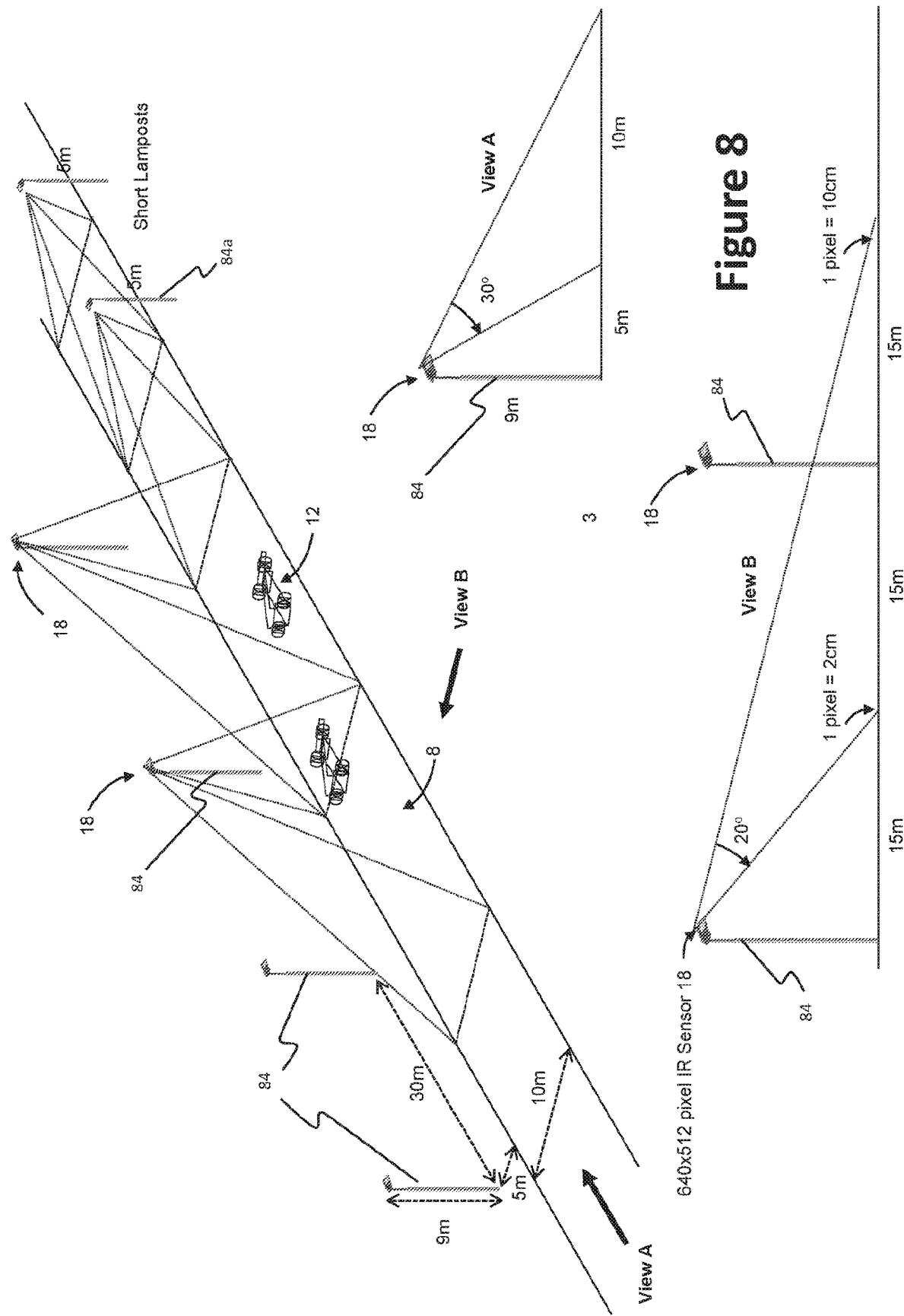

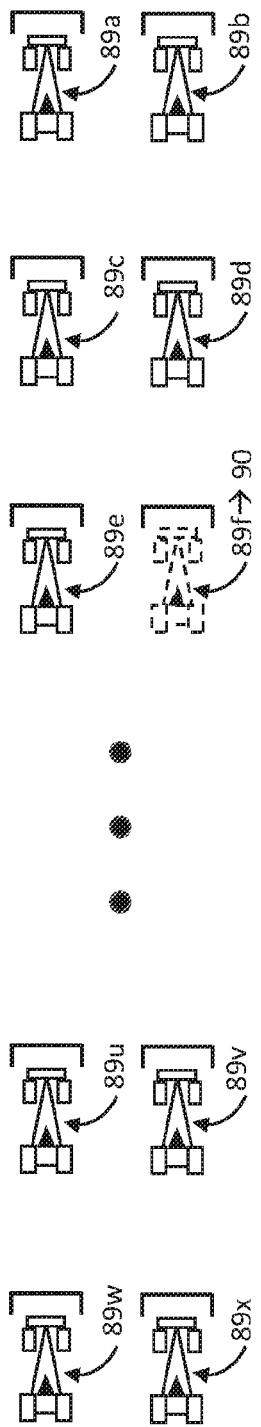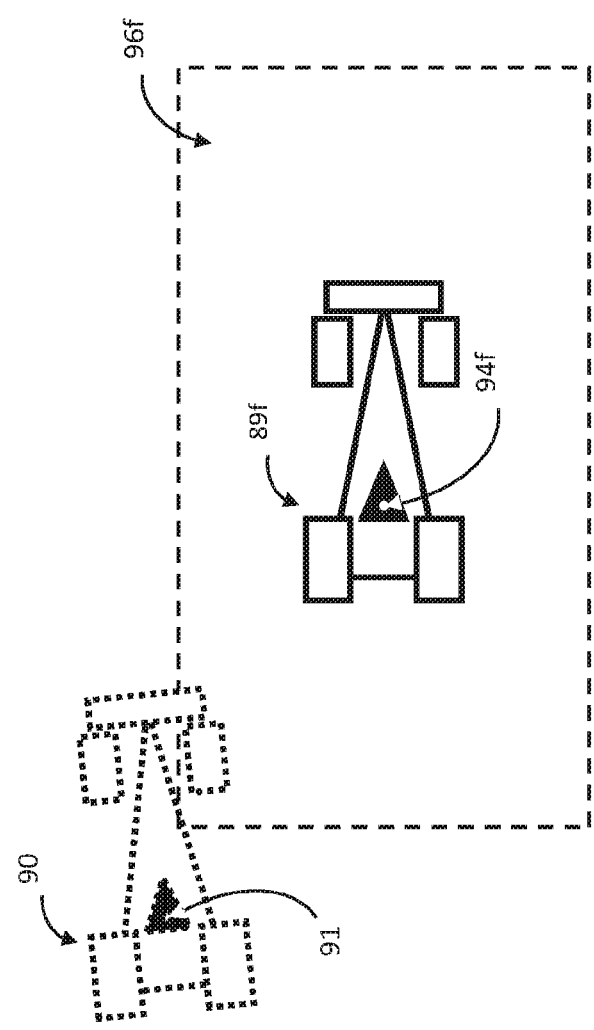
Figure 10a
Figure 10b

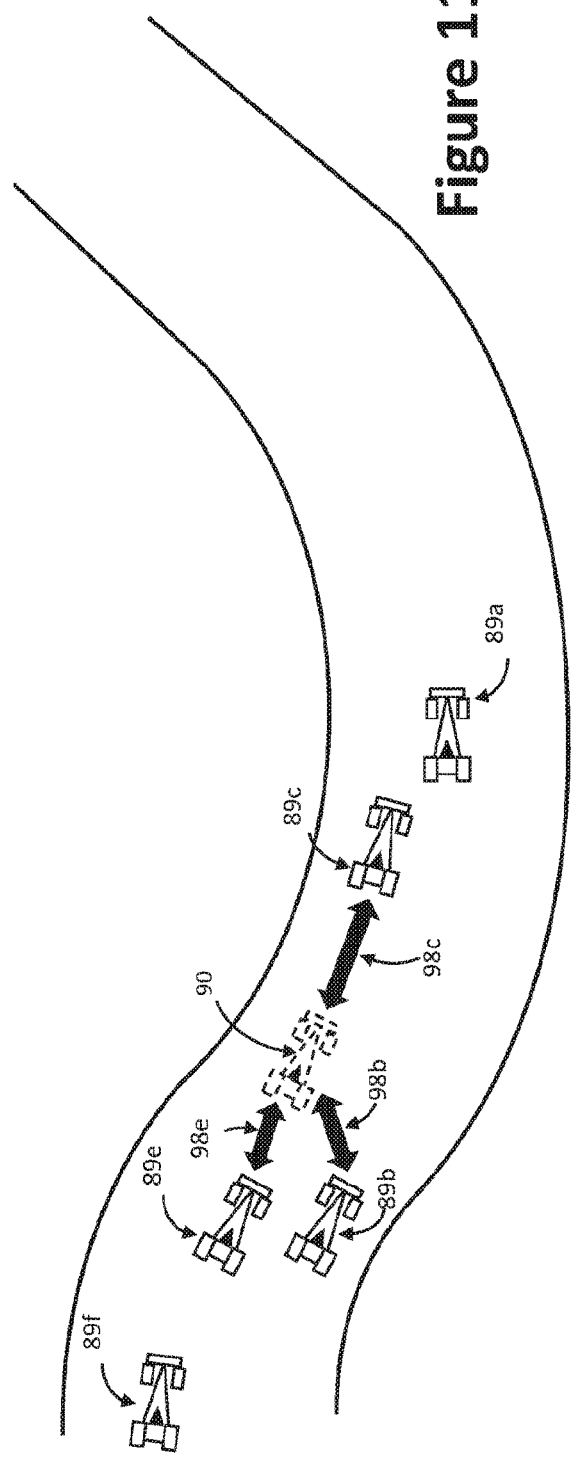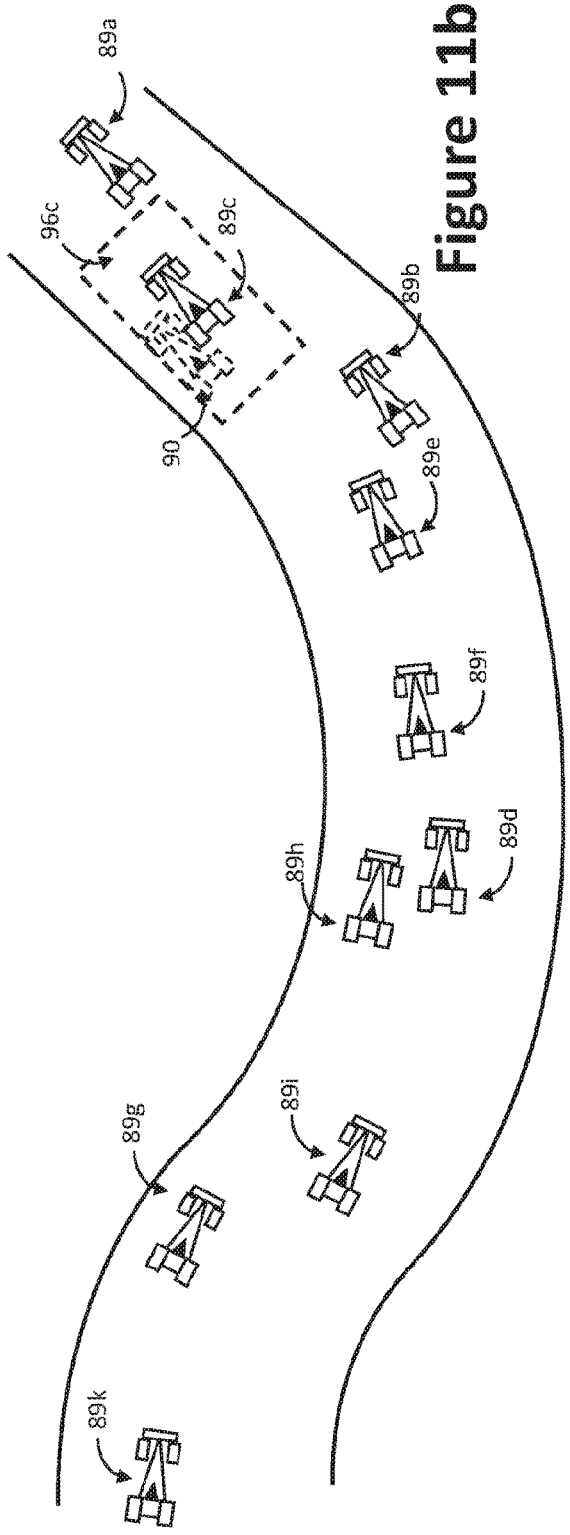

SYSTEMS AND METHODS FOR CONTROLLING AN INTERACTIVE HYBRID ENVIRONMENT REPRESENTING A MOTORISED SPORTING EVENT AT A TRACK

FIELD OF THE INVENTION

The present invention relates to systems and methods for controlling an interactive hybrid environment representing a motorised sporting event at a track. More particularly, though not exclusively, the present invention concerns methods and systems for mass engagement of remotely located gaming computers and possibly other entertainment devices with real, motorised sports events. The present invention also extends to the capture and live broadcasting of high accuracy, real-time vehicle tracking and vehicle control data from live motor sports events in real time and use of that data to provide a new form of gaming or viewing experience in which remotely located gamers can compete with actual participants in the motorized sporting event and remotely located viewers can engage with the event in a more interactive manner. The capture of accurate kinematic data enables application of the systems and methods to mass engagement in a range of other types of indoor and outdoor sporting events such as soccer, basketball, cycling and skiing.

BACKGROUND OF THE INVENTION

Various approaches have been used to provide life-like systems and methods for player-controlled virtual representations of motorised sporting events. Most of these are completely virtual with complex models determining the kinematic behaviour of virtual vehicles in response to user actuator inputs to try to provide a semblance of reality. The realism is often provided by building the models using real kinematic data obtained by recording the movement of vehicles during races. However, not only are such models complex and difficult to construct, but they are often based on inaccurate kinematic data. Also, such prior art approaches are often directed to single or a few players which means that the scope of interaction with other players is very limited. This all leads to non-scalable and unrealistic simulation and gaming experiences.

None of the known prior art that attempts to define systems and methods for player-controlled simulations to interact with a real live race extends to providing practical methods for mass engagement of a multitude of players and followers throughout the world concurrently with the real drivers, cars, race teams, track, off-track and event environments in a manner that proves satisfying and challenging to computer game players, supports the mass competition of esports tournaments and offers the features non-game playing followers desire to enhance their immersion in and enjoyment of live motor sports events. Achieving any of these objectives would broaden and intensify the appeal of for example motor racing to a fan base extending from the traditional television viewer or driver personality fan through the core of motor racing computer game fans to the consumers of 'over the top' race and technical data services.

The present inventors authored prior patent GB2518602B which describes systems, methods and technology to, amongst other applications, track cars accurately in a real live motorised vehicle race (e.g., Formula 1), passively and in all but the most extreme weather conditions, offering computer gamers the ability to replace one of these cars with a virtual car and, in effect, compete in the live race. The data provided by GB 2518602B relates to positional information of the motorised vehicles on a track as sensed non-invasively by a single IR tracking sensor positioned at a significant altitude (1-2 km) above the racing circuit, for example on a helicopter, drone, or lighter-than-air vehicle. This relies on the field of view (FOV) of the single sensor encompassing the whole enactment area. Taking Formula 1 as an example, this approach is impractical when the FOV is obstructed by vegetation (overhanging trees), grandstands or, in the case of city racing circuits all manner of buildings and other structures. Accordingly, this prior art approach has some limitations in its practical application.

Video games which interact with live events that describe in-game methods for a player-controlled virtual car to interact in a limited and somewhat artificial way with representations of the real cars via data that is streamed from a live event to a traditional computer racing game, are known for example see US 2010/0271367. The performance of the virtual car is determined by a combination of the player's inputs and the software models of the car and its environment. The physics-based models are part of the video game software and subject to many limitations in the fidelity they can achieve trying to simulate the very complex and dynamic scenarios typical of motor racing events. This leads to a poor quality of interaction between the virtual car and representation of the real car.

Other prior art documents (e.g., GB2365360A) have attempted to address this major deficiency by suggesting that the physics model simulations of the virtual car dynamics and its environment within the computer game can be pre-conditioned by data gathered from practice runs or conditioned in real time from performance data transmitted live from real cars and their environment to create an 'optimum physics model' of the vehicle and its environment that can then be controlled by the game player. This approach is subject to the same basic limitations in that there are no realistic means described to achieve the very high-performance tracking and in addition software models of real scenarios involving very complex motor vehicles operating in very complex environments involve so many variables and sophisticated relations between variables that, even when some of the more obvious variables are measured continuously and used, the models either:

a) deviate very quickly from reality due to the many approximations and shortfalls in the models; or
b) require colossal amounts of computing power and cannot possibly operate in real time even in the largest computers.

Yet other prior art documents (e.g. U.S. Pat. No. 6,155,927) describe in abstract form systems to enable computer game players to compete with live and recorded real races but provide none of the specific methods and system descriptions described in GB2518602B that would enable practical realisation of their abstract concepts.

GB2585165A, also co-authored by the present inventors, describes an approach to Infra-Red (IR) tracking of ordinary cars, lorries, etc on highway, road and street traffic networks where a tracking apparatus is located on low-level infrastructure such as a lamppost and IR emitters are placed on vehicles to enable their detection, or alternatively IR reflectors are placed on vehicles and optionally an IR lamp is included in the tracking apparatus. The high precision, real-time tracking data for the vehicle and its neighbours is then communicated by the tracking equipment to the vehicle in order to assist it with navigation and autonomous or semi-autonomous driving. The tracking apparatuses can be linked together into a linear, high integrity network so that vehicles can be tracked along a continuous, homogeneous stretch of road. The arrangement of tracking apparatuses in GB2585165 A has features that are not relevant to the current invention (for example, the aggregation and delivery of high integrity data to the motor vehicles themselves from the tracking apparatuses). Furthermore, as motorised sporting events typically require tracking of high-performance vehicles such as motor cars, motorcycles, etc around a closed, inhomogeneous circuit with challenging geometry (tight curves, chicanes, slopes, crests, pit-stops, etc) where the motor vehicles travel with very high accelerations, speeds, cornering speeds, etc., the systems and methods described in GB2585165A would not be able to cope as they are designed to monitor generally slower moving vehicles.

It is therefore an object of the present invention to overcome the limitations of the prior art documents discussed above. Also, it is desired, in different embodiments, to overcome the limitations on the precise tracking capability defined in GB2518602B and described above and provide improved, and for the first time, practically achievable systems and methods for interactive real-virtual motor racing mass engagement of a multitude of players and followers concurrently around the world for high-performance motor sports events in complex environments. It is also desired, in different embodiments, to specify how virtual drivers can interact with the real race and real drivers to enhance the player's experience and enable local, regional, national or global esports or competitive motor racing events that can operate fairly whilst being highly integrated with real motor sports events and competitions. The present invention is also applicable to the creation and use of recorded data regarding real motor sports events where the kinematic data of the competing vehicles, and vehicle control data (possibly the driver inputs), are recorded or faithfully reconstructed to the accuracy and latency requirements for computer gaming specified in GB2518602B.

SUMMARY OF THE INVENTION

According to one aspect of the present invention there is provided a computer-implemented method of controlling an interactive hybrid environment representing a motorised sporting event at a track, the interactive hybrid environment including representations of real and virtual vehicles on the track, the method comprising: receiving a stream of real data, the real data comprising real kinematic data of a real vehicle on the track and real control data regarding the control of the real vehicle by a driver, the real kinematic data being captured by infra-red sensors at the track and the real control data being captured by vehicle sensors and obtained via telemetry systems from the real vehicle; determining the position and kinematic behaviour of the representation of the real vehicle within the interactive hybrid environment using the real kinematic data; using the real control data and the real kinematic data to create a black box determination of the position of the real vehicle on the track based on the real control data; receiving a stream of computer-generated control data which is obtained by user interaction with a computer presenting the interactive hybrid environment to the user and capturing the user inputs to control kinematic behaviour the representation of the virtual vehicle; and determining the position and kinematic behaviour of the representation of the virtual vehicle within the interactive hybrid environment by using the black box determination and the computer-generated control data.

The use of the real data which includes both kinematic data and control data into the interactive hybrid environment enables an accurate black box determination to be made. This in turn provides a reference for the received computer-generated control data and enables accurate life-like kinematic control of the virtual vehicle in relation to the representations of the real vehicle on the track. The degree to which the user manipulates an actuator, for example, is accurately mirrored in the effect it has on the virtual vehicle in the same manner that the manipulation of controls by the driver in the real vehicle would affect the kinematic data (speed, orientation, acceleration, and location for example) of the real vehicle. This provides a realism that has not been possible with prior art approaches and enables movement in both the virtual domain and the real domain to be reflected accurately. Furthermore, this combination of features overcomes the interoperability problems of representations of vehicles from different domains being provided in the same hybrid environment in a manner that is realistic and accurate. When the real data is live data, namely data being streamed from an event that is occurring concurrently with the control of the interactive hybrid environment, for example, then the present invention enables virtual drivers in a virtual domain to compete in real time with real drivers in a real domain, which has not been possible previously.

Preferably the real sensor data comprises real kinematic data of a plurality of real vehicles on the track and real control data regarding the control of each of the plurality of the real vehicles by a respective driver. The embodiments of the present invention are designed to be enable competitive behaviour of multiple vehicles to be captured as whole, for example be seen in a Formula 1 race. Having streams of real data representing the behaviour of a plurality of real vehicles enables such competitive environment to be created. Each real data stream is capable of being processed separately and may also include a unique vehicle identifier.

Similarly, the stream of computer-generated control data may comprise a plurality of streams of computer-generated data, each stream being generated by a different user interaction with a respective computer and capture of the respective user inputs. This enables multiple users to be associated with the sporting event and advantageous allows mass gaming to be realised. Each computer-generated data stream is capable of being processed separately and may also include a unique computer device identifier.

Preferably where the plurality of real vehicles is less than the plurality of streams of computer-generated data streams, the method may further comprise linking a subset of two or more of the plurality of representations of virtual vehicles with a representation of one real vehicle to create a linked representation. Clearly in a mass gaming environment the number of users taking part via gaming computers/devices far exceeds the number of vehicles in a race (as there are typically physical limitations on the number of vehicles which can participate in a race for safety reasons). Accordingly, by linking two or more representations of virtual vehicles to a single representation of a real vehicle any number of users can be accommodated. This enables the method to be scalable for mass gaming scenarios where hundreds of thousands of users in the virtual domain can compete with drivers in the real domain at the same time.

In some embodiments, the method further comprises using the linked representation to represent the subset of the plurality of representations of virtual vehicles within the interactive hybrid environment whilst the position of the virtual vehicle of the subset is within tolerance limits of the real vehicle.

The plurality of computer-generated data streams is typically a plurality of times larger than the plurality of real vehicles in many embodiments and the linking step may comprise linking each of the plurality of computer-generated data streams to the plurality of representations of real vehicles in an even distribution. In other embodiments where the plurality of computer-generated data streams is a plurality of times larger than the plurality of real vehicles, the linking step may comprise linking each of the plurality of computer-generated data to the plurality of representations of real vehicles in a logarithmic distribution. Either way, it is possible to accommodate vast numbers of players/users in the interactive hybrid environment where there may be a discreet number of real vehicle representations.

In one embodiment, it is possible to have a central gaming server which creates the interactive hybrid environment and then which provides that to all of the gaming devices over a communications network. In this case, the method may comprise updating the interactive hybrid environment with new positions of the representations of the real and virtual vehicles as determined by the received real sensor data and computer-generated data; generating the updated interactive hybrid environment; and broadcasting the updated interactive hybrid environment from a central server to a plurality of remotely located computers. A central solution may require greater processing power but is relatively easy to update and control.

In an alternative embodiment, the gaming device of each user/player may generate the interactive hybrid environment locally, there being a plurality of such local environments created. In this case, the method may comprise broadcasting the black box determination and the real sensor data from a central server to a plurality of remotely located computers; generating the interactive hybrid environment at each remotely located computer; updating the interactive hybrid environment with new positions of the representations of the real and virtual vehicles as determined by the received real sensor data and computer-generated data; and transmitting the new positions of the representations of the virtual vehicles to the central server. Such a distributed solution may require greater management but does not suffer from the potential of bottlenecks and is generally less susceptible to time delays and lag in generation of the interactive hybrid environment.

In some embodiments, the method further comprises varying the association between the computer-generated control data and the resultant position of the virtual vehicle using an artificial intelligence engine, which references the black box determination. The use of such an artificial intelligence engine enables assistance to be provided to each player in their control of their virtual vehicle. Such assistance can provide a handicap factor which enables weaker virtual gamers to compete more fairly with professional drivers in the real domain.

In most embodiments, the received real kinematic data comprises longitudinal positional data with respect to the track, lateral positional data with respect to the track and vehicle orientation data with respect to the track. These types of data enable the kinematic behaviour of the vehicle to be accurately mapped into the virtual domain.

In some embodiments the real control data comprises one or more of steering wheel position, accelerator position, braking pedal position and gear selection of the real vehicle. These are typical control data which telematics system provide information for and which help to determine the driver control inputs which determine the real vehicle's track position. Also, advantageously these data can be readily related to corresponding actuators which can be controlled by the player in the virtual world.

Different embodiments generate the interactive hybrid environment from different sources of real data. In one embodiment the source is a store of real data which has been previously recorded. Accordingly, the method may further comprise retrieving the real sensor data from a data store which has stored copy of the real sensor data as the real sensor data was generated. In an alternative embodiment, the source is from the sporting event itself and in this case the receiving step comprises receiving the real sensor data substantially in real time as the sporting event is occurring.

In one embodiment, the stream of real sensor data has a sampling rate of at least 25 Hz and the position of the real vehicle at a point in time is captured and provided to the interactive hybrid environment within 40 milliseconds of being captured. This enables a real-time realisation of the real domain within the virtual domain which operates at a minimum refresh rate of 25 Hz. More preferably, in some embodiments, the stream of real sensor data has a sampling rate of at least 60 Hz and the position of the real vehicle at a point in time is captured and provided to the interactive hybrid environment within 16.7 milliseconds of being captured. This refresh rate is that found typically in most computer monitors and so supports a high-quality representation of the real time event within the virtual domain.

To assist in the generation of the interactive virtual environment, the method may further comprise using stored data models. This can make the virtual environment more realistic to the player.

Furthermore, it is possible to receive video and audio data streams from the real vehicle to enhance the interactive hybrid environment. In this case the method may comprise receiving a stream of video data or audio data from the real vehicle and including the stream of video data or audio data in the interactive hybrid environment.

In order to facilitate mass gaming, in some embodiments the method further comprises linking the representation of one of the virtual vehicles of the plurality of virtual vehicles to a representation of one of the real vehicles of the plurality of real vehicles at a point in time when the position of the representation of the virtual vehicle is within a predetermined threshold of the position of the representation of the real vehicle and using the representation of the real vehicle as the representation of the virtual vehicle in the interactive hybrid environment. This advantageously enables massive numbers of virtual vehicles to be included in the interactive hybrid environment without cluttering up the screen with huge numbers of representations of virtual vehicles. In fact, this form of representation solves the technical problem of how to present a motorised sporting event involving possibly millions of players within a limited screen size. Furthermore, the challenge of live-linking millions of computer games players and other fans around the world with motor sports events is addressed by some of the present embodiments this enables the provision of provide interactive experiences that are challenging, satisfying and entertaining for gamers and viewers and, crucially for esports events which are increasingly attracting professional games players, able fairly to manage and rank all the players as an integral part of the real-virtual motor racing event.

In some embodiments, where audio and/or video data is being provided from the real vehicle, the linking step (also referred to as 'snapping' herein) may activate the provision of the received stream of audio or video data from the real vehicle to the computer presenting the interactive hybrid environment to the user. This enables the sights and sounds which are being experienced by a particular real vehicle to be provided into the virtual domain to make the interactive hybrid environment more realistic.

In some embodiments, the method further comprises unlinking the representation of one of the virtual vehicles of the plurality of virtual vehicles with the representation of one of the real vehicles of the plurality of real vehicles at a point in time when the position of the representation of the virtual vehicle is outside the predetermined threshold of the position of the representation of the real vehicle and presenting the representation of the virtual vehicle separately to the representation of the real vehicle within the interactive hybrid environment. This enables the virtual vehicle representation to be displayed when it is not matched to a real vehicle representation and thereby enables the player to see the actual position of their virtual vehicle in relation to the representations of the real vehicles and to transition between representations of real vehicles within the interactive hybrid environment.

It is also possible in some embodiments for aspects of the interactive hybrid environments to be relayed back to the teams associated with the real vehicles as is described later. In this case, the method may further comprise providing details of any virtual vehicle linked to a representation of the real vehicle to a remotely located third party computer.

In some embodiments it is possible to match the performance of a virtual vehicle to that of a closely positioned representation of a real vehicle. Where each real vehicle has a different set of performance characteristics this can enable fairer gaming. In this embodiment the method further comprises determining the closest positioned representation of a real vehicle of the plurality of real vehicles to the representation of the virtual vehicle and adopting the set of performance characteristics of the closest representation of the real vehicle as the performance characteristics of the virtual vehicle.

Some embodiments also include the step of capturing positional data of the real vehicle on the track using the infra-red sensors, converting the positional data over time into the stream of real kinematic data and transmitting the same in real time to a central server.

Preferably, the capturing step comprises capturing the positional data using groups of sensors monitoring different portions of the track, wherein each sensor in each group of sensors detects infra-red radiation either reflected or transmitted from the one or more vehicles operating on the track within a field of view (FOV) of the sensor. This arrangement is particularly advantageous in order to provide accurate real-time information for the interactive hybrid environment and is discussed later.

In some embodiments, the method further comprises processing the infra-red radiation detected by the infra-red sensors to determine kinematic data of the one or more real vehicles operating on the track. Preferably this processing is carried out at each sensor and enables smaller amounts of data to be transmitted for use in the interactive hybrid environment.

According to another aspect of the present invention there is provided a computer system for controlling an interactive hybrid environment representing a motorised sporting event at a track, the interactive hybrid environment including representations of real and virtual vehicles on the track, the system comprising: a receiver for receiving a stream of real data, the real data comprising real kinematic data of a real vehicle on the track and real control data regarding the control of the real vehicle by a driver, the real kinematic data being captured by infra-red sensors at the track and the real control data being captured by vehicle sensors and obtained via telemetry systems from the real vehicle; a virtual race command processor configured to receive a stream of computer-generated control data which is obtained by user interaction with a computer presenting the interactive hybrid environment to the user and capturing the user inputs to control kinematic behaviour the representation of the virtual vehicle; and a virtual race simulation engine including: a race simulation output engine for determining the position and kinematic behaviour of the representation of the real vehicle within the interactive hybrid environment using the real kinematic data; a reference black box model generator configured to use the real control data and the real kinematic data to create a black box determination of the position of the real vehicle on the track based on the real control data; and a gaming black box implementing engine configured to determine the position and kinematic behaviour of the representation of the virtual vehicle within the interactive hybrid environment by using the black box determination and the computer-generated control data.

The computer system may in some embodiments further comprise an artificial intelligence engine which is configured to vary the association between and the resultant position of the virtual vehicle. The artificial intelligence engine may in some embodiments be configured to broaden thresholds required of the received computer-generated control data to generate a given position of the virtual vehicle.

As will described in greater detail below, some of the embodiments of the present invention are concerned with improvements in or relating to systems and methods for millions of players of motor sports computer games around the world to interact concurrently with real, live motor sports events for any entertainment purpose whatsoever including but not limited to computer gaming, esports tournaments, streaming, viewing, gambling and general enhancement of fan engagement with motor sports. One embodiment enables computer games players to start a race by digitally twinning with one of the real cars and to transfer from car to car, or operate as an additional car, depending on certain parameters. It is to be appreciated that the term 'car' and 'vehicle' are used interchangeably within the present specification but have the broader meaning of any vehicle. When twinned with a car, the method of dynamic, black box simulation can be used to ensure that the performance of the virtual car in its environment closely matches reality, thus providing a realistic, challenging, enjoyable and fair contest between a computer game player and the real drivers. This system and method for one player then forms the basis for an extended system and method for millions of players to interact with the real event concurrently and competitively. The systems and methods can also be used for enabling participants that are just viewing motor races, rather than playing a computer game, to interact much more engagingly with motor sports events. The systems and methods can also be used to enhance viewer and computer gamer engagement with a range of other sports.

In general, the present embodiments of the invention are concerned with improvements over the known prior art for capturing and live broadcasting high accuracy, real-time vehicle tracking data in a motorised vehicle race (e.g., Formula 1) thereby enabling a genuinely fair, competitive, and enjoyable race between computer gamers and professional drivers plus a wide range of other viewing and entertainment enhancements. The improvements encompass the capture and broadcasting of tracking data from any motor sports venue for a significant number of high-performance vehicles competing in a live event such that the broadcast data is accurate enough, in real time and in a format suitable to enable computer games and other entertainment media to integrate and exploit the data, whether live or previously recorded, thereby enhancing the computer gaming experience and/or providing additional benefits to motor-sports organisers and fans such as user-selectable viewpoints, customised streaming, user-targeted advertising, live gambling, etc. In certain embodiments, whilst competing in a live-linked race a gamer is allowed to change the real car chosen at the start of the race to different real cars during the race, or to operate as an additional car, given certain parameters, so allowing the gamer to match their abilities with other car drivers at any position they find themselves in during the race. On selecting the option to change to a new real car the capability of the gamer's car is matched to the new real car again establishing a fair and competitive race with the new real driver. The systems and methods herein are then extended to enable an unlimited number of gamers to participate in an engaging, fair and competitive manner. In certain circumstances the gamer can also see and interact with other virtual cars, but in all circumstances the systems and methods herein enable a fair and competitive race between an unlimited number of gamers in a virtual environment and the real drivers in a real environment, the integration of which is termed an interactive hybrid environment. The systems and methods herein can also be applied to other sporting events and a number of representative examples are described.

Thus, embodiments of the present invention conveniently provide systems and methods of operation for interactive real-virtual motor racing events whereby, when the systems and methods are in use, any number of participants using the virtual environment (interactive hybrid environment) can interact with the real live event and with the real drivers either:

a) by competing as individual virtual drivers of all experience and skill levels in and amongst the real drivers and possibly a limited number of other virtual drivers (the total number of virtual drivers being anything up to the number of real drivers) in live, compatible motor sports events in a realistic, satisfying, challenging and fair way, or b) by competing in massive multi-player organised, esports computer gaming events, or any other computer gaming events or activities (often self-organized amongst friends or contacts), that are highly integrated with live, compatible motor sports events in a realistic, satisfying, challenging and fair way, or c) by being involved as observers using the systems and methods of the current embodiments to enhance their live viewing or live streaming experiences.

According to another aspect of the present invention, there is provided a sensing system for providing positional data of one or more moving entities operating on an enactment area to a central server, the sensing system comprising a plurality of sensor groups, each of the sensor groups being configured to monitor a portion of the enactment area, and each of the sensor groups comprising: a plurality of positional sensing devices positioned around the enactment area, with each of the positional sensing devices configured to monitor a different portion of the enactment area from an elevated position, wherein each of the positional sensing devices comprises: an infra-red sensor having a field of view (FOV) for detecting infra-red radiation either reflected or transmitted from the one or more moving entities operating on the enactment area within the FOV and generating a sensor output; and a transmitter configured to transmit the sensor output of the infrared sensor, or information derived therefrom, to another one of the plurality of positional sensing devices of its sensor group which acts as a communications node for that sensor group; and communications equipment communicably coupled to the positional sensing device which acts as the communications node within a sensor group, the communications equipment being configured to transmit the sensor output, or the information derived therefrom, of each infra-red sensor of the sensor group to a central collation server.

In some embodiments, each of the sensor groups comprises 10 or less positional sensing devices. Minimising of the number of positional sensing devices advantageously ensures an optimum balance between latency of data transmission and complication of the system by the need for additional communication paths.

Within a group of some of the embodiments, at least one of the positional sensing devices of the sensor group comprises a processor configured to determine current kinematic data of the one or more moving entities operating on the enactment area within the FOV, in at least two dimensions, based on the sensor output, or information derived therefrom. This feature can vastly improve reduce the amount of data that is to be transmitted around the system and therefore increase transmissions speed of information because the sensor output is processed before it is transmitted to the communications node.

In some embodiments, a first sensor group of the plurality of sensor groups is configured to relay the sensor output, or information derived therefrom determined by the first sensor group onto a second sensor group of the plurality of sensor groups.

In various embodiments one or more of the plurality of positional sensing devices may comprise a Long Wave Infra-Red (LWIR) microbolometer or Medium Wave Infra-Red (MWIR) photon detecting camera configured to detect thermal IR emitted by the one or more real moving entities on the enactment area. Also, one or more of the plurality of sensing devices may comprise one of a Short Wave Infra-Red (SWIR) or Near Infra-Red (NIR) photon detecting camera to detect broadband or narrowband light emitted or reflected from the moving entity.

Preferably to accurately detect very fast-moving vehicles, one or more of the plurality of positional sensing devices may have a frame rate of at least 60 Hz and more preferably at least 100 Hz. This compares favourably with a minimum gaming refresh rate of typically 25 Hz to 60 Hz.

Preferably in some embodiments, one or more of the plurality of positional sensing devices is configured to detect a unique identifier of the moving entity based on the infra-red signature. This is very useful for tracking purposes where there are multiple moving entities being tracked within the same FOV of the positional sensing device. The unique identifier can be a modulated IR signal from an emitter on the moving entity, with each different entity having a different modulated signal.

Other optional features of the one or more of the plurality of positional sensing devices include an LED floodlamp directed toward portion of track which is configured to detect reflected light originating from the LED floodlamp. Such illumination of the real vehicle provides more resilience in poor lighting and adverse weather conditions. In some embodiments, one or more of the plurality of positional sensing devices is configured to detect an infra-red signature of the vehicle composed of modulated infra-red light. Such modulation provides further resilience against variable environmental factors and also advantageously enables distance measurements to be more accurate.

To assist with relative positional determination, one or more of the plurality of positional sensing devices may be configured to detect infra-red radiation reflected or emitted at edges of the enactment area and the system may be configured to use the detected information as a frame of reference to determine a lateral position of the moving entity.

The positional sensing devices may, in some embodiments, be directed to face oncoming real vehicles. In order to capture the infra-red signature of the real vehicle they may be positioned at an angle to the horizontal and vertical directions. More specifically in these embodiments at least some of the positional sensing devices are arranged to have a boresight (central line) of their field of view (FOV) which is at an acute angle to the horizontal or vertical planes and face oncoming moving entities in use as they progress through the enactment area. Different configurations are possible and so in some embodiments at least some of the plurality of positional sensing devices comprise an FOV of 20 to 30 degrees and a detection range up to 50 metres. In other embodiments, least some of the plurality of positional sensing devices comprise an FOV of 70 degrees and a detection range up to 15 metres.

In some embodiments, the system further comprises a GFS receiver. The GPS receiver provides a time stamp for the sensor output, or information derived therefrom, and the system is configured to use the time stamp to establish a common time reference for sensor output or data derived therefrom from at least some of the positional sensing devices.

As mentioned above, in some embodiments the communications equipment is configured to operate at a minimum 25 Hz refresh rate to provide the sensor output or information derived therefrom, of the one or more moving entities operating on the enactment area to the central server. Using this refresh rate, provides a sufficient resolution of data to enable high-speed vehicles (operating up to 220 mph for example) to be tracked and their kinematic data provided to an interactive hybrid environment. However, in a more preferably embodiment the communications equipment is configured to operate at a minimum 60 Hz refresh rate to provide the sensor output or information derived therefrom, of the one or more moving entities operating on the enactment area to the central server. Use of this refresh rate matches that of most computer gaming monitors and so assist in provide a real life-like representation of the movement of the entities within for example an interactive hybrid environment.

The processor of each positional sensing device may in some embodiments be configured to determine the longitudinal position along the enactment area, the lateral position across the enactment area and a rotational orientation of the moving entity.

In some embodiments the plurality of positional sensing devices of a sensor group is arranged in sequence and a positional sensing device at a mid-point of the sequences acts as the communications node of the sensor group. This arrangement minimises the communications hops between positional sensing devices to the communications node. So for example with a group of 9 sensors with the 5$^{th}$ sensor being the communications node, the maximum number of hops for the sensor output, or information derived therefrom, of any position sensing device to get to the communications node is 4 hops.

In motorised sporting event embodiments, the moving entities comprise vehicles and the enactment area comprises a track.

According to another aspect of the present invention there is provided a system for generating and controlling an interactive hybrid environment representing a motorised sporting event at a track, the interactive hybrid environment including representations of real and virtual vehicles on the track, the system comprising: a computer system as recited above in combination with a sensing system as recited above.

According to another aspect of the present invention there is provided a computer-implemented method of determining an updated position of one or more user-operated virtual vehicles on a virtual representation of a track using data from one or more physical vehicles operating on the track, the method comprising: associating, at a processor, each of the one or more user-operated virtual vehicles with one of the one or more physical vehicles; receiving, at the processor, initial position data of the one or more physical vehicles indicating their position on the track at a first time; determining, at the processor, initial position data for each of the one or more user-operated virtual vehicles on the virtual representation of the track based on the initial position data of the physical vehicle which it is associated with; subsequently receiving, at the processor: position data of the one or more physical vehicles indicating their position on the track at a second time; driver input data for each of the one or more physical vehicles; and user inputs for controlling operation of the one or more user operated virtual vehicles; determining a position of the one or more user operated virtual vehicles at a third time based on the subsequently received position data, driver input data and user inputs.

Some embodiments of the present invention provide the tracking capability, particularly in terms of data latency and co-ordination of data from multiple vehicles, demanded by very fast-moving vehicles around an inhomogeneous racing circuit for racing events that can be staged globally in any type of environment whether city, urban or extra-urban. In particular, these embodiments specify how the tracking of real drivers can be achieved concurrently around a complex, cluttered, city-based track with tunnels, adjacent buildings and other obstacles preventing tracking by a single line-of-sight, high-altitude IR sensor. Systems embodying the present invention are characterised as specific architectures of computer, communication and sensor hardware containing computer software, the whole configured to individual, or configurable and conveniently deployable to a wide range of, motor-sports venues such that all competing vehicles can be tracked concurrently around complex racing circuits in diverse configurations and environments that are tailored to push vehicles to their limits of performance. Each configured architecture of equipment and software, tailored to an individual racing circuit, is able to deliver a real-time, single dynamic data stream representing the accurate positions of all of the real competing vehicles within a highly representative computer-based model of at least the topology of the real racing circuit, the data stream being suitable in accuracy, latency and possibly other aspects of representational fidelity to be distributed over the internet or other communication technology to millions of computer gaming devices concurrently. The computer gaming devices embody some or all of the methods described below and typically involve any of the range of computer hardware that participants use traditionally either to play motorsport-related computer games or to experience motor sports events or recordings via digital data streams provided by commercial or other suppliers.

The present embodiments provide enhancements to the technologies described in GB 2,585, 165A below whereby tracking apparatuses are arranged into an architecture that can deal with the extreme challenge of tracking high-performance motor sports vehicles in complex environments and build a single, integrated, real-time data stream comprising the high-accuracy, real-time tracking data for all competitors concurrently, suitable for broadcast and use in gaming and other entertainment environments. The IR sensing capabilities of the tracking apparatuses herein encompass those described in GB 2,585,165 A, however the inclusion within this application of the thermal IR tracking technologies described in GB 2,585,165 A, goes beyond the technologies described in GB 2,518,602 B and allows the possibility of tracking motor sports vehicles based on their thermal IR signatures alone.

The above-described features of the embodiments are combinable in different ways and can be added to the following specific description of the embodiments of the present invention if not specifically described therein.

BRIEF DESCRIPTION OF THE DRAWINGS

In order that the invention may be more readily understood, reference will now be made, by way of example, to the accompanying drawings in which:

FIG. 3a is a schematic block diagram showing the format of real data received from the live event data capture system of FIG. 1;

FIG. 3b is a schematic block diagram showing the format of virtual race commands received from the gaming computers/devices of FIG. 1;

FIGS. 7a and 7b are schematic diagrams showing two possible strategies used in the present embodiments for creating a highly representative, computer-based data model of the racing circuit;

FIG. 8 is a collection of three-dimensional diagrams showing sensor arrangements and their respect fields of view around a racing track in accordance with an embodiment of the present invention;

FIG. 10a is a schematic plan view of a starting configuration of a Formula 1 motor race involving 24 real cars and drivers linked to a video game with only one player wherein a real car has been allocated to or selected by the player as their starting position.

FIG. 10b is a schematic plan view of a real vehicle representation and a player's simulated vehicle on a track where the player's simulated vehicle has diverged in instantaneous position and possibly other attributes such as speed, velocity and acceleration from the real vehicle representation by known amounts.

FIG. 11a is a schematic plan view of a racing situation where the simulated car is positioned in between three nearest real car representations;

FIG. 11b is a schematic plan view of a continuation of the racing situation of FIG. 11a at a slightly later time where the simulated car has gained ground on and come close to an advanced real car representation;

DETAILED DESCRIPTION

The computer gaming methods described below all assume that each computer gaming element of the system (comprising the game player's computer/tablet/phone/ . . . and/or remote server hardware and all associated software) can provide traditional functions typical of motor sports-related games whereby a player can provide inputs to the computer system to control the progress of a simulated motor vehicle around a detailed data model of a real racing track. The player's simulated vehicle can interact with the track model and with other simulated vehicles that are controlled either by the game's physics models and artificial intelligence (AI) functions, or other types of simulations, or by other players. Those other players can either be present and providing inputs to the same computer system or can be in other locations using remote computer systems that communicate over the internet or other suitable network, sometimes with the involvement of games servers, with those of the original player or players to provide realistic interactions between all vehicles and between all vehicles and the track. The methods of the present embodiments described below all add to or modify or replace those traditional functions.

Considered as a whole, this new environment in which a system embodying the present invention resides can be considered as a multi-component infrastructure that provides support for mass engagement of computer game players and other interactive viewers with live motor sports and other types of sporting events. The new environment in which the present embodiment resides comprises three elements:
  a. a multiplicity of devices used by players and viewers such as gaming consoles, personal computers, simulators, arcade gaming devices, satellite receiving & processing equipment, smart phones, tablets, etc., including possibly their camera and audio capture devices for streaming from participants, located anywhere around the world;
  b. the Internet and associated computing equipment such as servers, real time data centres, real time server clouds plus possibly dedicated games and entertainment servers, to support in real time the receipt, manipulation, combination, storage and dissemination of the data derived from players and viewers possibly including but not limited to their audio, video, game data and control inputs when driving virtual cars; and
  c. real, live motor sports or other sporting events including in particular the enhancements and developments described herein to the systems of GB2518602B and GB 2365360A, and other systems that collect and provide other data about the real, live event as it happens and systems that store data relating to live events for use at some future time.

Figure 1:
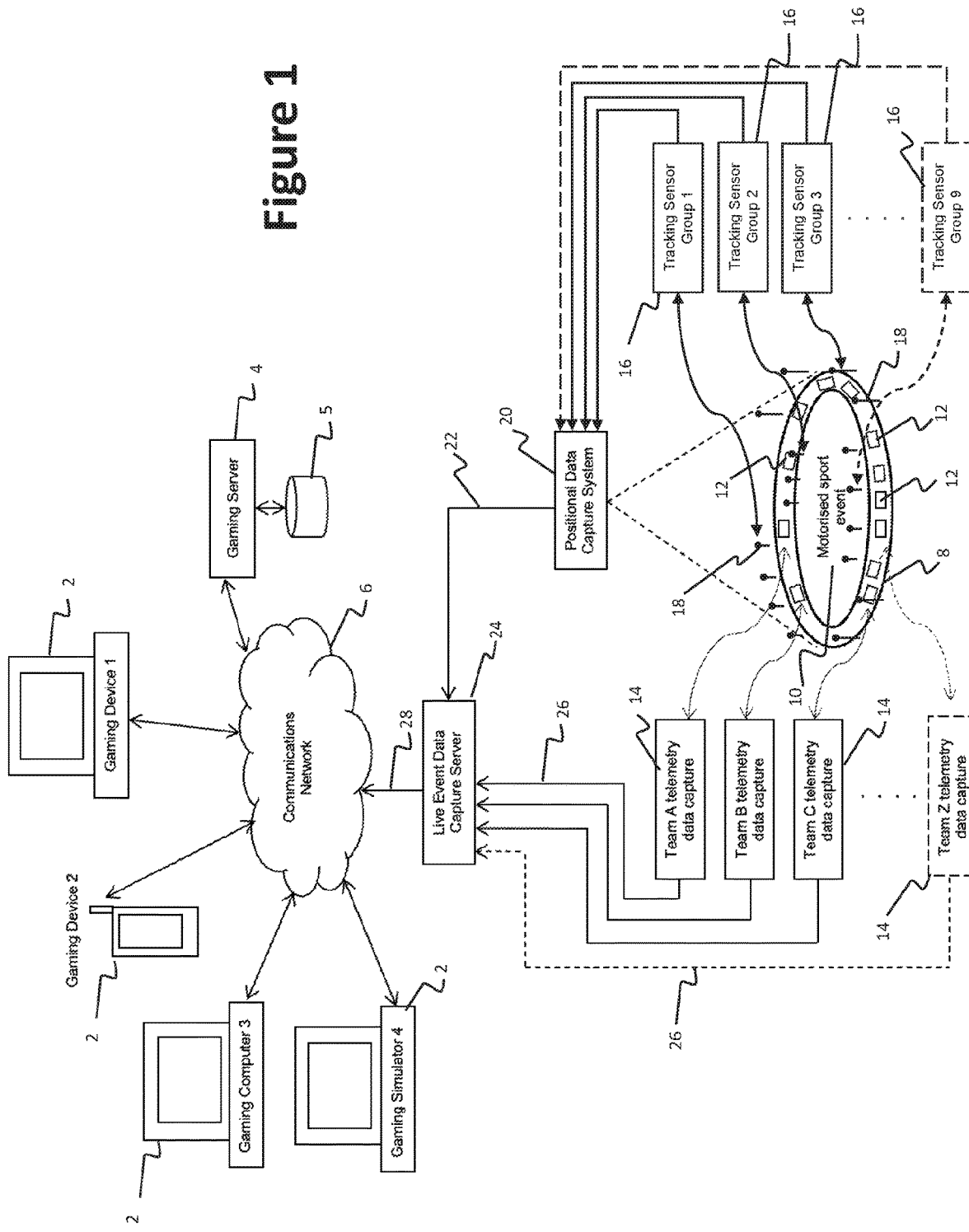
FIG. 1 is a schematic diagram showing a three-part gaming environment which includes an embodiment of the present invention; the three parts including a plurality of gaming devices, a gaming server and a live event data capture system.

Specific embodiments are now described with reference to the appended figures. Referring now to FIG. 1, the above described three basic elements are shown schematically which encompasses a non-limiting embodiment of the present invention. More specifically, FIG. 1 shows several different gaming devices 2 connected to a central gaming server 4 via a communications network 6. The gaming server also includes a local data store 5 for collating different types of kinematic and control data. FIG. 1 also shows a track 8 of a motorised sporting event 10 which includes real vehicles 12 located at different positions around the track 8. Each vehicle is equipped with a vehicle telemetry system which wirelessly provides a stream of data via communications infrastructure around the circuit to a corresponding team telemetry data capture computer 14 such that control data (driver controls of the vehicle) as well as other data relating to the operation of the vehicle 12 can be analysed. This stream of telemetry data can also include live video data from an on-board camera on the vehicle 12 and audio data from a microphone provided on the vehicle 12. This overall telemetry system is able to ensure each team's data remains
  a. private to the team,
  b. available in defined part to organising and governing organisations and
  c. available in defined part for broadcast on TV and other media streams.

The track 8 is also equipped with a plurality of groups of sensors 16 (nine such groups are shown schematically, though this is non-limiting, and a different number can be provided in other embodiments). Each sensor group 16 is composed of a plurality of track side infra-red sensors 18 which are configured to detect infra-red radiation emitted from the vehicles 12 as they race around the track 8 and convert the sensor data into real kinematic data about each vehicle 12 in the sensors' field of view (FOV). Each sensor group 16 can communicate this real kinematic data to a positional data capture system 20 which collates the streams of individual kinematic data and provides a stream of kinematic data 22 about all of the vehicles 12 on the track 8 to a live event data capture server 24. Streams of live telemetry data 26 from the team telemetry data capture systems 14 are also provided to the live event data capture server 24.

The live event data capture server 24 collates information received from the positional data capture system 20, comprising a plurality of groups 16 of tracking sensors, the team telemetry systems 14. All this information (a real sensor data stream 28) is provided to the gaming server 4 in this embodiment which provides data orchestration and generates the virtual race simulation. The virtual race simulation is provided to all the gaming devices in this embodiment. However, in another further embodiment (described later with reference to FIGS. 16 to 20), the virtual race simulation is generated on each gaming device/computer 2 with the gaming server 4 simply orchestrating the overall gaming process.

In a further embodiment described later with reference to FIG. 5, the live event data capture system also collates other information received from the teams including all data produced by the teams, and has a general event data capture system, covering all other data relating to the motor sports event that may be relevant to the entertainment and gaming functions. In this further embodiment, all of the information is provided to the entertainment and gaming server which provides entertainment feeds for the non-game-playing fans, possibly via licensed distributors, the whole ensuring that the data security needs of all stakeholders as exemplified in Paragraph 62 above for telemetry data are fulfilled as will be described later.

Figure 2:
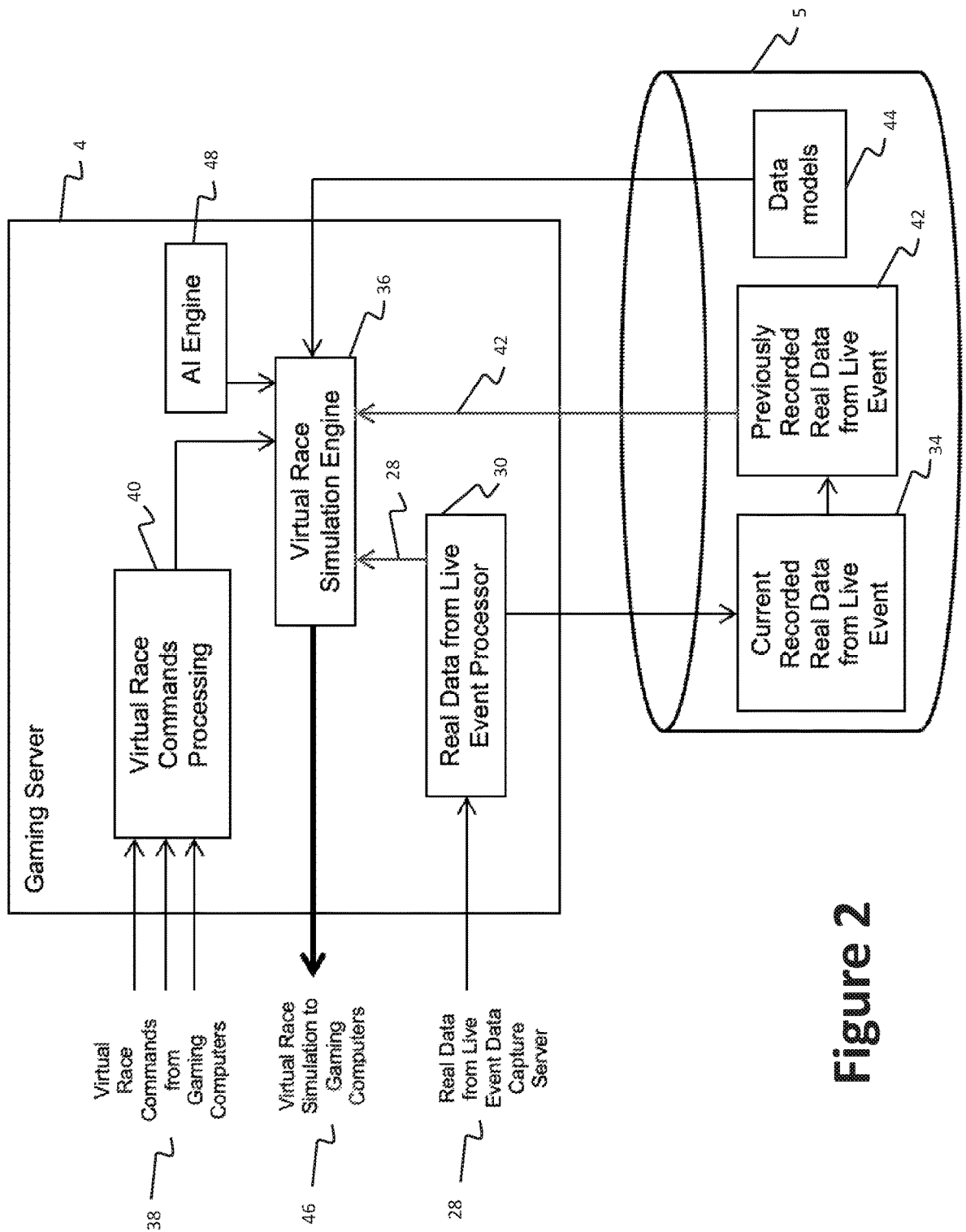
FIG. 2 is a schematic diagram showing the gaming server of FIG. 1 in greater detail.
Figure 6:
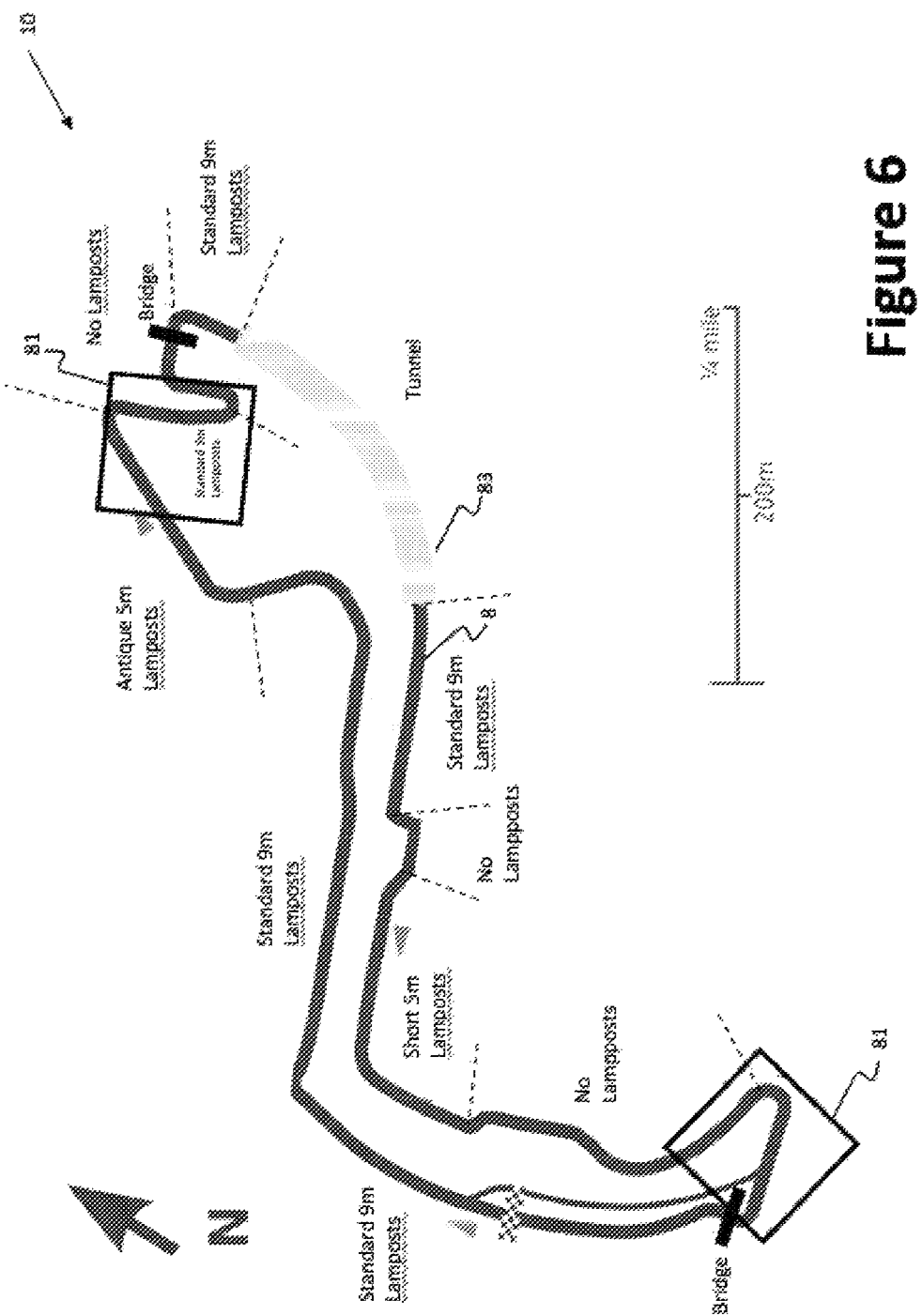
FIG. 6 is a plan view of a Monaco grand prix route map showing the location of different types of IR sensors.

The elements which make up the gaming aspects of the gaming server of the system shown in FIG. 6 are shown schematically in FIG. 2. The gaming server has a real data processor 30 for processing real data (sensor data streams) 28 received from the live event data capture server 24, the live event data capture server 24 having ensured the synchronisation of all of its contributing data sources (streams of kinematic data 22 and streams of live telemetry data 26) as described in detail below. This received live event data 28 is stored in the data store 5 as current recorded real data from the live event 32 and also passed on to a virtual race simulation engine 36 where it is used to generate a reference black box model generator (described later) which maps the real driver inputs (control data 26) of each vehicle 12 to the kinematic positional data 22 of that vehicle 12. The term 'black box' is used in its conventional sense in the art namely a system or engine which is characterised by its response to signals applied to its input ports. The output of this reference black box model generator is then used within the virtual race engine 36 to assess player virtual race commands (driving inputs) 38 which are received from the gaming devices 2 via the communications network 6 to determine where the position of each virtual vehicle should be as a result. In the present embodiment, a virtual race command processing engine 40 is provided to receive these player virtual race command data streams 38, to convert them into a common format if required and to provide them to the virtual race simulation engine 36.

As an alternative to the real-time live race data 28, previously recorded real data 42 from a live event stored in the data store 5 can also be used to generate the virtual black box functionality. The virtual race simulation engine 36 also uses data models 44 stored in the data store to generate a virtual race simulation 46. Finally, an AI engine 48 is optionally provided to assist in conditioning the virtual car's response to the driver inputs (virtual race commands 38) with reference to the black box model created by the reference black box model generator (described later) and possibly to assist the driver of the virtual car (the player) to varying degrees, possibly with reference to the virtual driver's earned handicap for example, to make the racing between the real driver and virtual drivers of varying skill and experience levels fairer. For example, this assistance can be to broaden thresholds around each player input (virtual race commands 38) to equate it to an optimum position for the virtual vehicle. So, whilst using the reference black box model generator to determine an optimum set of control data inputs to result in a given vehicle position, the player control inputs 38 can be within thresholds of those particular control data inputs 26 to result in a given position for the car. The degree to which those thresholds are adjusted can determine the handicap applied by the AI engine 48 for a given player and the control of their corresponding virtual car. It is to be appreciated that an AI engine 48 is used as it can be trained on an array of complex combinations of control data inputs to give a particular vehicle position output.

The real vehicle data 28 which is received in this embodiment from the Live Event Data Capture Server 24 is shown schematically in FIG. 3a. Here it can be seen that the specific vehicle data 28 is linked to a vehicle ID 50 and comprises kinematic real vehicle data 22 (for example longitudinal position 52b, lateral position 52c and orientation data 52a), as well as driver input data (control data) 26 such as steering position 54a, braking position 54b, accelerator position 54c, gear selection 54d and possibly other actuator control inputs (not shown). This is provided for each of the real vehicles 12 being raced around the track 8.

The virtual vehicle control data (virtual race commands) 38 which is received in this embodiment at the gaming server 4 from the gaming devices/simulators/computers 2 is shown schematically in FIG. 3b. This virtual control data 38 comprises a Gaming Computer ID 56 as well as the player actuator inputs 58 for controlling the virtual vehicle and possibly other data. The vehicle control player inputs 58 include steering position data 58a, braking position data 58b, accelerator position data 58c, gear selection data 58d and possibly other actuator control inputs (not shown) and typically match or vary by measured amounts from those of the real driver such that the reference black box can be used to determine virtual vehicle position as a result of those inputs.

Figure 4:
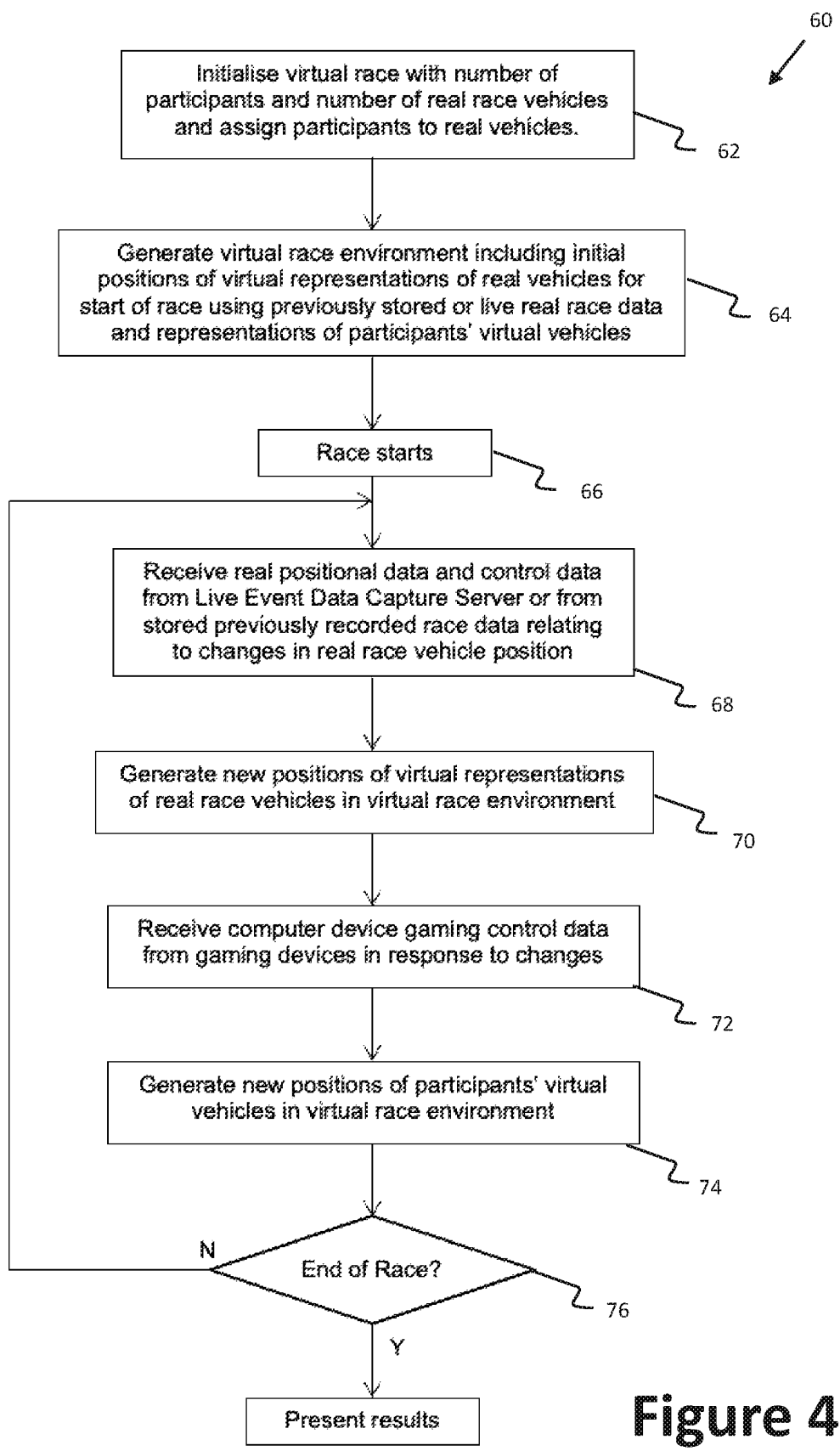
FIG. 4 is a flow diagram showing a method of operation of the gaming server of FIG. 1.

The general manner of operation of the system at the gaming server 4 is shown in the overview flow diagram of FIG. 4. The method 60 commences at step 62 with a set up phase where amongst other things all of the virtual participants are assigned to one of the real vehicles 12 taking part in the race. A single real vehicle 12 can have multiple players assigned to it as is described in detail later. Following this, a virtual race environment model 46 is generated at Step 64 including the race circuit data model and the initial positions of the virtual representations of the real vehicles. As mentioned earlier this can be based on either live data 28 from the live event 10 or prerecorded data 42 from a previously recorded live event. The circuit data model and possibly other data models 44 are stored in the local data store 5 to generate the virtual race environment 46. Once the race commences at Step 66, a stream of data 28, 42 from the live event or from the prerecorded event, comprising the accurate kinematic data 22 for all of the real cars 12 as measured and synchronised at a sequence of precise time points spanning the duration of the race is received at Step 68 and using this, the positions of the representations of the real race vehicles 12 can be changed. These new positions are used to generate at Step 68 new positions for the representations of the real vehicles in the virtual race environment 46 which are then transmitted (not shown) to each of the gaming devices 2 registered for this race for display to the relevant player. In response, the gaming server 4 receives at Step 70 gaming control data 38 which indicates the player's user inputs to control their virtual vehicle. These player's user inputs 38 are then compared to the inputs of the reference black box model generator and this is used to generate at Step 72 the subsequent positions of the virtual vehicles as a consequence of the players user inputs 38. These new positions of the virtual vehicles can in some embodiments (see detailed description of another embodiment below) then be transmitted (not shown) to each of the gaming devices 2. This process of Steps 68 to 74 continues until the end of the race which is determined at Step 76.

The method of operation of the system of the present embodiment is characterised by the following advantageous features;
   a) provides accurate and timely live data from a real motor sports event in any type of environment to millions of players and followers around the world concurrently;
   b) provides computer game players of all skill and experience levels with a realistic, challenging, satisfying and fair simulation of participating in the real race either:
     i. as one player racing against the real drivers and a limited (up to the number of real drivers minus 1) number of other players all of whom are represented in the game;
     or
     ii. as a player and competitor in an organized esport event or other computer gaming event involving any number (potentially millions) of other players and possibly the real drivers some or all of whom are represented in the game;
   c) optionally provides data from any number of players and followers around the world to the real race teams and real drivers during the race event for any purpose including, but not limited to, presenting to the teams (or even the drivers) in real time information about the players participating in the event; and
   d) optionally provides motor sports followers with any data from the real event and/or all the players and/or all the esports competitions that are linked to the live event to enable them to interact and enhance their engagement with and enjoyment of the event.

Figure 5:
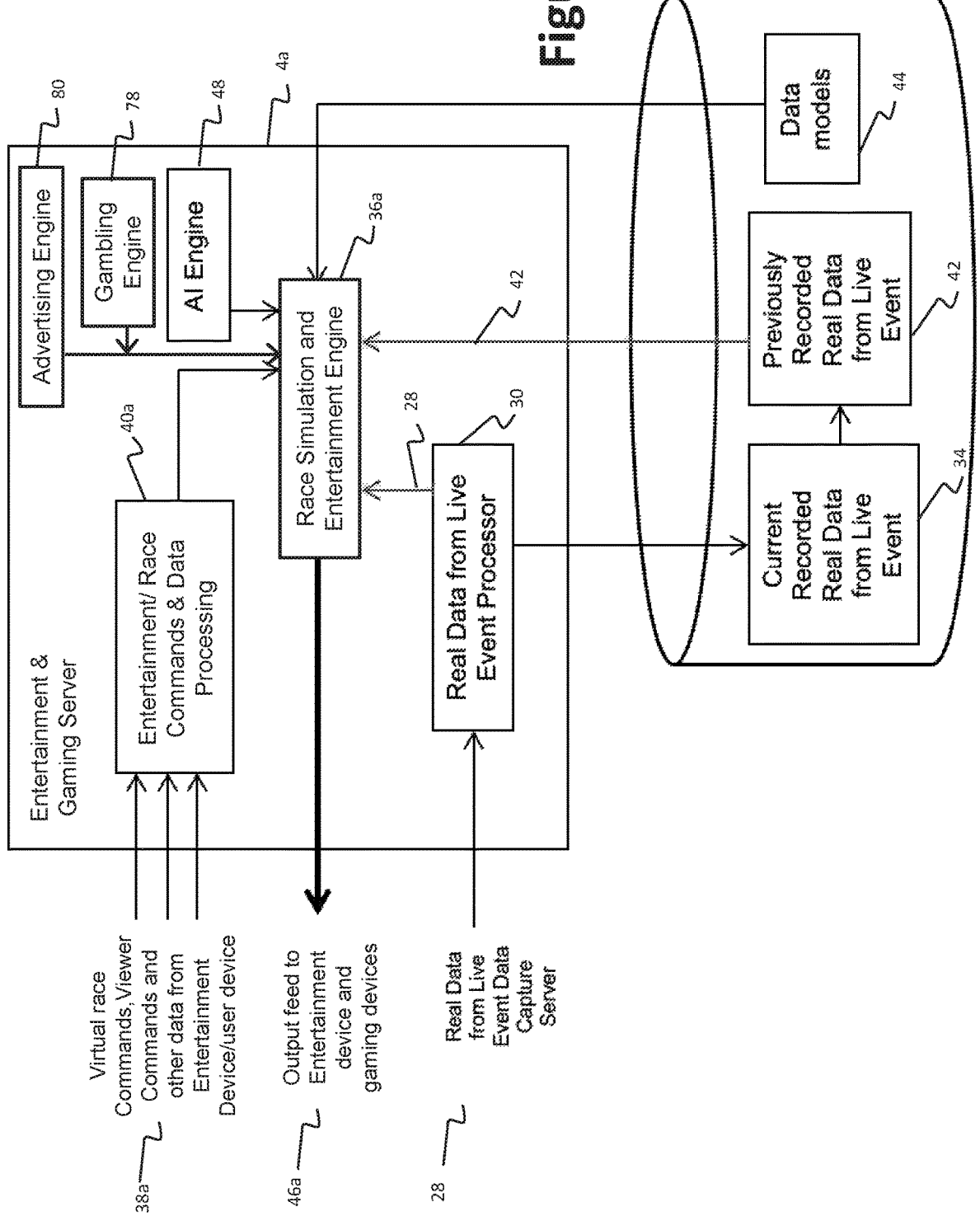
FIG. 5 is a schematic diagram showing the gaming and entertainment server of another embodiment of the present invention which replaces the gaming server of FIG. 1.

In a further embodiment, the gaming server 4, described above with reference to FIG. 2, can be replaced by a gaming & entertainment server 4a as shown in FIG. 5, this gaming and entertainment server 4a acts in the same manner as the gaming server but adds additional functionality. Accordingly for the sake of brevity, only the differences between the gaming server 4 of FIG. 2 and the gaming and entertainment server 4a of FIG. 5 will now be described.

Referring to FIG. 5, where the components of the gaming & entertainment server 4a are the same as that of the gaming server of FIG. 2, the same reference numerals have been used. Where there are any differences, new reference numerals have been introduced. Accordingly, it can be seen that in this embodiment the gaming & entertainment server 4a additionally comprises a race simulation & entertainment engine 36a which receives virtual race commands, viewer commands and other data 38a from gaming devices 4 and other entertainment devices (not shown). This data is collected and routed through to the race simulation and entertainment engine 36a via an entertainment/race command & data processing engine 40a. Further a gambling engine 78 and an advertising engine are provided which also provide data to the race simulation and entertainment engine 36a.

There are many entertainment enhancing features that can be provided based on the availability of accurate tracking data from the positional data capture system and just three will be illustrated by way of examples below. The first is a roving viewing point whereby, based on viewer commands from the entertainment device, a live video stream, for example from the driver's viewpoint in one of the real cars, can be seamlessly switched or panned to a computer-generated viewpoint, for example above the car, by software functions in the entertainment engine that are common with or very similar to the virtual race simulation engine in FIG. 2. The second example is the augmentation of a live video stream with computer generated displays or overlays that are convincingly integrated into the live video, for example temperature dependent colouring of the tyres or 'under-the-hood' graphics of the car machinery, based on live technical data derived from sensors or other sources on the car. This can be extended to the augmentation of a live video stream, for example from the driver's viewpoint in one of the real cars, with convincingly and seamlessly integrated advertising images on trackside hoardings or bridges, or on the cars, the computer-generated adverts from the advertising engine 80 moving dynamically with the trackside scenery or cars so as to be indistinguishable from adverts that appear on the live video stream. As this advertising is combined for streaming to a specific, known user, the advertising can be tailored to the user based on data received into the Entertainment Commands and Data Processing functions and on algorithms contained in the Advertising Engine 80. The third example is the ability of the entertainment viewer to place live bets on the events as they unfold in the real race, for example "car 1 to overtake car 2 on the inside line in the next 20 seconds". The gambling engine enables such functionality and provides this to the race simulation and entertainment engine 36a.

There now follows, by way of example of the systems and methods provided by the present invention, a description of the specific operation of the positional data capture system 20 which encompasses the tracking sensor groups 16 as introduced in the above non-limiting embodiment. In order to understand the positional data capture system 20 of the above embodiment more clearly reference is first made to a demanding racing track.

Referring to FIG. 6, there is shown an example of a particularly demanding racing circuit 8 that cannot be monitored by a single, high performance IR sensor from above and requires a novel system of sensors 18 and communication equipment to provide the data required for real-time, interactive gaming. As an illustrative example of the live motorised sporting event 10 is an International Formula 1 Race involving 24 real cars in 12 teams each with pits, garages, and other equipment. The race location is at the particularly complex circuit illustrated in FIG. 6. It is in a built-up location involving tall buildings, bridges and tunnels and has various types of permanent street and traffic infrastructure as well as temporary infrastructure such as spectator stands. It is subject to a prevailing range of atmospheric, weather and lighting conditions depending upon the time of year and the location in which the event is taking place.

FIGS. 7a and 7b illustrate two possible strategies used in the present embodiments for creating a highly representative, computer-based data model 44 of the racing circuit 8 suitable for ensuring that the links can be made in real time between the measured kinematic data of the real vehicles 12 and the virtual kinematic data of the game player's virtual car in a manner that can overcome the problem of verifying that the fidelity of the circuit representation is accurate and correct enough. This model 44 is a vital link between the real environment and real event 10 and the computer gaming environment and computer gaming event 46 as each tracking sensor 18 in the network of tracking sensors will have a real field of View (FOV) of a portion of the circuit 8 as well as the relationship in its memory between the real FOV and a portion of the data model 44 of the racing circuit 8. In this way, images of IR reflectors or IR emitters on a car, or the image of the natural thermal infra-red emissions from the car, are converted within the tracking sensor 18 to kinematic data expressed in terms of the racing circuit data model 44. Note it is also possible in another embodiment for that raw data from the tracking sensors 18 to be first communicated to another component of the overall system where the relationship of the raw data to the circuit data model is calculated before being forwarded to the gaming server 4 for processing.

Referring more specifically to FIG. 7a, one example basis for a data model 44 comprising an orthogonal grid 82 of closely spaced latitude and longitude lines is shown. The spacing of the grid lines is appropriate to the tracking accuracy achievable by the tracking sensors 18 and desired by the computer gaming software. Kinematic data in this model typically comprises at least longitude data 52b, lateral data 52c and rotational orientation data 52a for each vehicle 12. The circuit model may also include precise altitude data for each cell in the latitude-longitude grid 82 to enable the virtual interactive hybrid environment to simulate vertical g-forces, accelerations etc.

FIG. 7b shows an alternative model that promotes computational elegance; the circuit is modelled as a series of lateral strips each of which has a geographical position (latitude, longitude and altitude) of a lateral center point of the lateral strip, an orientation, a lateral width and possibly (in some embodiments) a lateral slope angle or altitude profile. Kinematic data for each car then comprises at least longitudinal position 52b along the track 8, lateral position 52c across the width of the track 8 and rotational orientation 52a—as reflected in FIG. 3a.

The high-accuracy relationship between the computer game data model of the circuit and the topography of the circuit in the real world has historically been surprisingly difficult to establish. With the overall system of the current embodiment, this can be solved by calibration at the time of system set-up of each sensor 18 by means of, for example, placing static IR reflecting/emitting markers (not shown) at precisely measured positions along the perimeter of the racetrack 8 within each camera's FOV and creating a very accurate physical to data-model mapping. Dynamic calibration is achieved in some embodiments by, for example, driving, or moving in stages, a special purpose calibration vehicle along each edge of the racetrack 8 to calibrate tracking performance and achieve continuity between sensors 18.

The present inventors have appreciated that the topology of such a complex environment as shown in FIG. 6 precludes connecting the required 100 or more tracking sensors in a 'star' configuration to a central positional data capture system so that they all communicate in parallel. For wireless communication it is highly unlikely that 100 independent, reliable signal paths can be found and wired connections would involve 100 km or so of cabling spread radially across the cityscape, which is highly disadvantageous. The only reliable path for either technology is around the circuit 8 linking the tracking sensors 18 in a closed-loop geometry—in which case at least one point on or near that circuit will have to accumulate the data in real time. If it is only one point, then there will be at least 50 individual data hops from equipment to equipment required from some sensors and the accumulated data transport delays would be intolerable.

Real time interactive gaming between two geographically separated players/computers A & B requires the effects of player inputs to gaming device A to be received and processed by gaming device B within 20-40 ms, and vice versa in parallel, determined by a typical computer game update rate of 25-50 Hz. It is to be appreciated that the term 'computer game' is synonymous with a simulated environment and includes an interactive hybrid environment. In the current embodiments, the whole positional data capture system, including the tracking sensors 18, can be seen as providing the equivalent of player inputs for all 24 real cars on the circuit and this data must be supplied to the remote gaming devices 2 within a similar latency time delay. It is possible to introduce an overall time lag of, say, 1 second to the data stream by using data-time tagging to ensure synchronization (described as an option in more detail below), but this would put the whole live gaming experience behind other information streams such as live video, which is not desirable. Hence, with an infra-red camera frame rate of 100 Hz (up to 10 ms delay) and allowing 5 ms further for raw image signal processing, there can only be allowed around 20-30 ms for the aggregation of data from the sensors 18 around the circuit 8 and its onward communication. For either wired or wireless technologies the inventors have determined that taking this into consideration 50 hops along the tracking sensor circuit cannot be tolerated in this embodiment and that no more than 10 hops along the tracking sensor circuit is essential even taking into account anticipated developments in communications technologies.

The illustrative groups of sensors 16 shown in FIG. 1 are therefore converted into an IR sensor network architecture with small groups of sensors 16 arranged into a high-performance local network, but also tailored for the real circuit of FIG. 6 taking into account a range of other factors including viewing angle geometry, lines-of-sight, obscuration (between cars 12 and between cars and infrastructure), available mounting points, IR sensor capabilities such as image resolution (typically 640×512 or 1280×1024) and frame rate (typically 100 Hz), image processing parameters such as the numbers of "pixels-on-target" (typically>4 required), required tracking accuracy (10 cm or better laterally, less rigorous longitudinally due to the high speeds but much lower relative speeds between cars), maximum car speed in each sensor's FOV, processing worst case execution times, etc., the overall objective being to have an output from the positioning data capture system 20 in FIG. 1 comprising the kinematic data of FIG. 3a (for example) for each of the 24 cars 12 synchronized to a common, accurate time base, with an update frequency of at least 25 Hz and, should a real time lag prove necessary, an overall real-time delay of no more than 1 s (note that the real driver input data of FIG. 3a, which is sensitive and confidential to the teams, is protected by means of fixed or dynamic encryption if it is transmitted to the gaming devices or is used in the central gaming server and not transmitted at all to gaming devices).

To illustrate the method of architecture definition for a specific circuit 8, illustrative approaches to a plurality of possible sensor groups 16 are described in more detail below. It must be noted that these examples rely to some extent on the capabilities of today's available technologies, for example IR camera image resolutions, frame rates, LED intensities, etc, and that these technologies are evolving and improving rapidly.

FIG. 8 shows representative configurations of specific sensor arrangements 18 suitable to monitor specific types of racing circuit sections with a specific class of racing cars 12. These particular (F1) cars 12 have an aerodynamic, forward sloping and low profile which means they are most likely to be reliably detected at high speeds if the tracking sensors 18, provided at an elevated position as compared to the track, are oriented towards the oncoming cars, namely that the FOV has a boresight which is at an acute angle to the horizontal plane when looking towards the oncoming cars. The boresight of the FOV is considered to be a central axis of the FOV. This arrangement also means that the sensors 18 can be conveniently located nearer to the ground and have an increased FOV compared to the purely downwards facing sensors in GB2585165A. In some situations, much taller poles or other structural mounting points 84 may be suitable in which case less sensors 18 may be required to monitor the track and the boresight angle to horizontal will be increased. Alternative configurations can be defined similarly for other types of locations or other types of motor racing events, for example power boat racing or NASCAR motor racing.

Referring specifically to the example circuit shown in FIG. 6, a way in which sensors 18 could be arranged to provide the positional data capture system 20 is now described.

Firstly, for the total 2 km of sections in the circuit of FIG. 6 that are furnished with standard lampposts, FIG. 8 illustrates one of many possible arrangements of groups 16 of IR sensors 18 mounted on lampposts 84 in this section of the track 8. Each sensor (sensing device) has an illustrative resolution of 640×512 pixels, a field of view of around 20° by 30° (see Views A and B) and a detection range of up to 50 m. With this geometry it is considered possible to achieve reliable detection down to a resolution of at worst 10 cm with any of the following implementation sensor device 18 arrangements:

a) A long wave infra-red (LWIR) microbolometer or medium wave infra-red (MWIR) photon detecting (or other suitable technology) camera detecting the thermal IR emitted by the car (its tyres, engine, exhaust, etc) or alternatively detecting thermal IR 'cold spots' created by applying or attaching IR non-emitting markers or material to the car.

b) A short-wave infra-red (SWIR) or near infra-red (NIR) photon detecting (or other suitable technology) camera detecting the broadband (or narrowband) light emitted by at least two small LEDs or LED clusters fitted to the car or detecting natural (sunlight derived) IR radiation from reflectors on the car or detecting cold spots from IR non-emitters on the car. The light emitted by the LEDs may be constant or modulated over time.

c) An SWIR or NIR camera detecting the broadband (or narrowband) SWIR or NIR light provided by an LED floodlamp located near the IR camera and reflected by at least two small reflectors fitted to the car or detecting cold spots in the reflected image from IR non-emitters on the car. This would enable night racing and the LED floodlamp may be pulsed and synchronized with image capturing in the camera in order to improve detection performance in extreme weather environments.

As stated above, the location of all the individual targets (LED emitters, reflectors, non-emitters or car/tyres) in the raw image on the camera focal plane array are converted to accurate positions within the circuit model by signal processing and geometric calculations tailored to the specific placements, configurations and orientations of the tracking sensors, possibly involving the measured relative positions of each of two emitters (or reflectors or non-emitters) on the car 12 in relation to its outer physical envelope. Such techniques are well within the capabilities of the skilled person and so do not need to be described further herein.

Continuity of identification and tracking of individual cars 12 can be achieved as in GB2585165A by each tracking sensor communicating the position of the car to the next sensor along as it leaves its FOV. Note that in relation to the arrangement of a SWIR or NIR camera as described in b) above, the LED light may be either constant or may be modulated in a manner which emits a distinct pattern (or IR signature) for each car 12. This would enable concurrent tracking and identification by each tracking sensor and remove the need for tracking sensors 'handing over' vehicle identification to the next tracking sensor.

Secondly, there may be locations around the circuit 8 (for example the black squares 81 in FIG. 6) that lend themselves to a single IR camera 18 positioned at a greater height, either mounted on the top of a building or on a mobile boom lift (up to 45 m) or access platform (up to 100 m) or carried by an airborne vehicle such as a drone or tethered drone (whereby power can be supplied for extended flight durations and data delivered to ground stations). At 100 m height, the FOV of a single IR sensor 18 fitted with a wide-angle lens extends to some 140 m×140 m (the black squares 81 on FIG. 6 are representative in scale). On some circuits 8 it may be preferable to arrange several drone-mounted sensors 18 around the circuit in order to form completely the closed-loop network, Each drone would stay on station using its own onboard GPS and provide accurate image referencing by the placement of fixed IR beacons on the ground from which absolute tracking detection accuracy can be achieved. This is an efficient arrangement as less sensors are needed to cover the entire circuit and the ease of deployment of this arrangement is extremely good for circuits that do not have sensors permanently installed. The safety case for flying drones above a high-performance motor race is feasible as the drones need never be directly above the circuit or above spectator areas. Tethered drones may have a particular advantage because a failed drone could be rapidly reeled down to a defined crash zone around the base station.

Thirdly, the short lampposts 84a in FIG. 8 can be fitted with wide FOV (70°) IR sensors each covering a short road segment of around 15 m in length, the same applying in the tunnel 83 where the sensors 18 will be attached to the roof of the tunnel. In another alternative embodiment, it may be more cost-effective not to use short lampposts 84a and deploy mobile masts up to 30 m high, each covering a road segment up to 50 m in length. In summary, this example complex circuit which is 3.3 Km in length would require 50 standard sensors, 50 wide-angle sensors and 2 long-range high platform or drone-mounted sensors.

It must be noted that on many racing circuits lampposts may not be present for safety reasons or may be more widely separated and taller or may have to be protected so that they do not present a safety risk to cars. Mounting tracking sensors temporarily on buildings or using mobile masts appropriately placed may be necessary or preferable in different embodiments.

Figure 9:
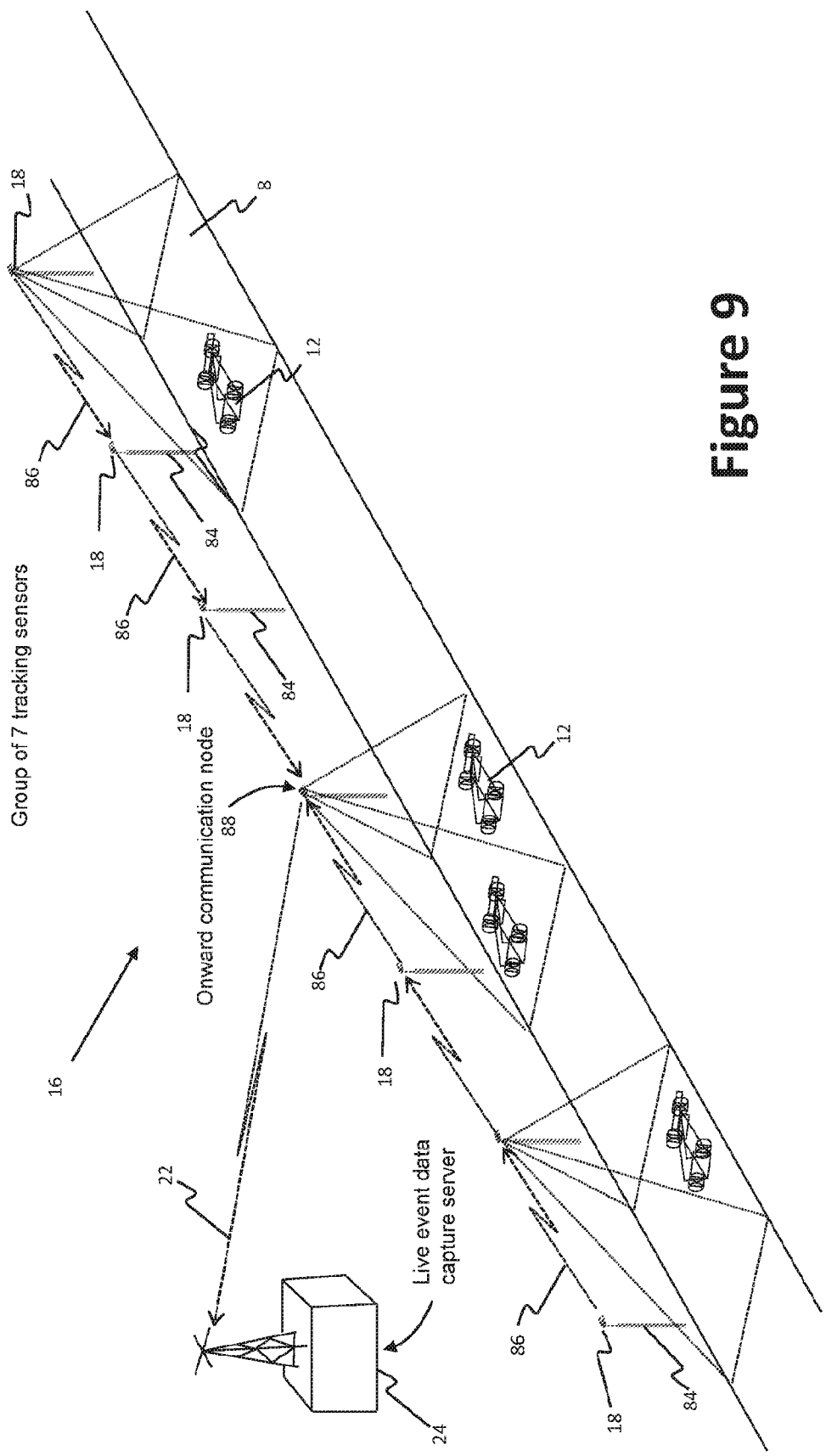
FIG. 9 is a three-dimensional diagram showing a group of sensors of FIG. 1 and the communications arrangements between that group of sensors in greater detail and their respect fields of view around a racing track.
Figure 19:
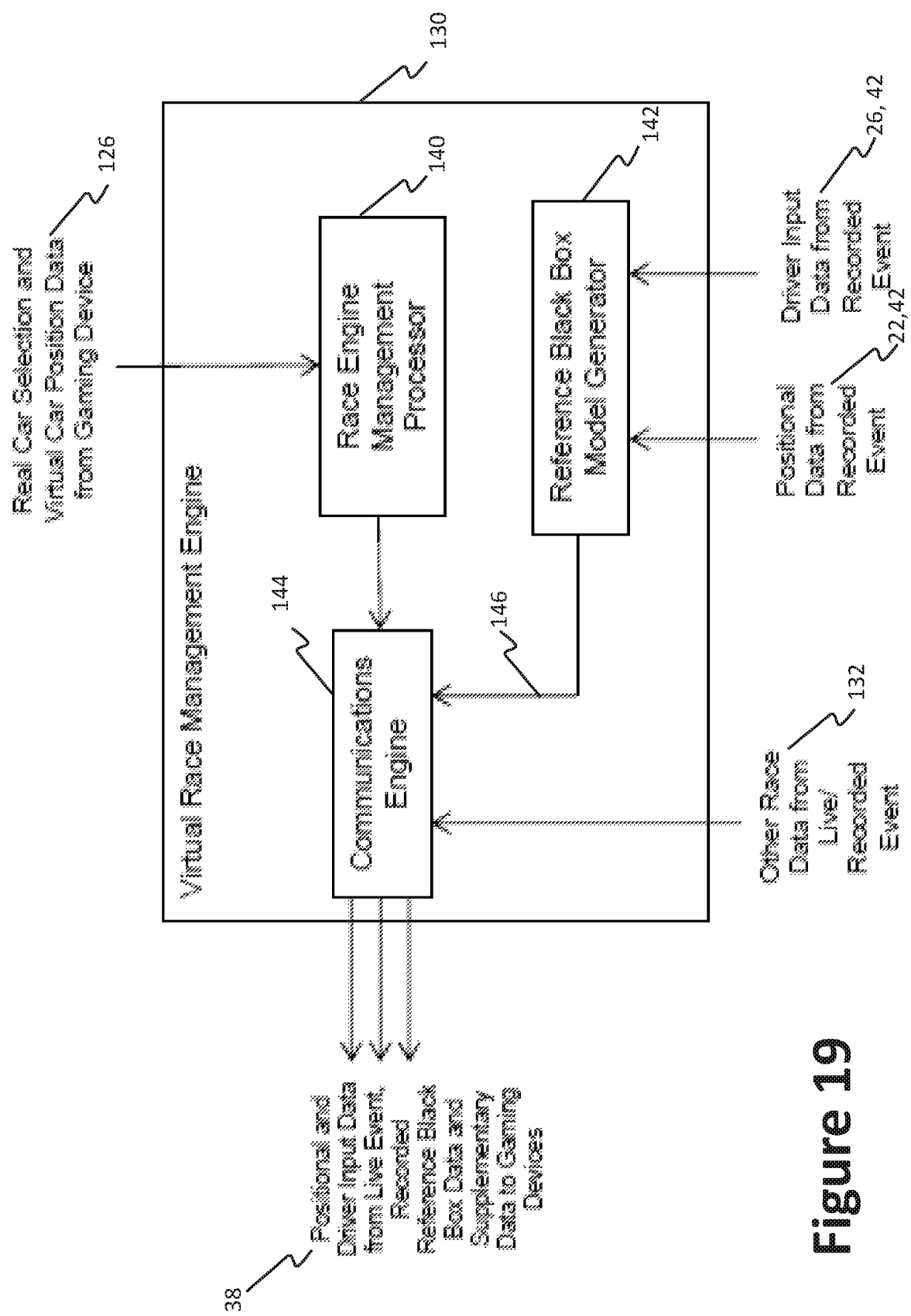
FIG. 19 is a schematic block diagram showing the virtual race management engine of FIG. 17 in greater detail.

Finally, in order to achieve the real-time data streaming performance criteria stated above the ground-based and/or drone-mounted tracking sensors of this example are organized into a plurality of groups 16 as shown generally in FIG. 1 but more specifically in FIG. 9. FIG. 9 shows an illustrative example of how sensors 18 are arranged in groups 16 in order to achieve the overall real time performance of the positional data capture system 20 and how sensors 18 and groups 16 can communicate data in order to provide a single, complete and continuously synchronised data stream 28 with the appropriate latency suitable for transmission into the real-time, interactive gaming environment 46. FIG. 19 shows one group 16 of seven sensors 18 mounted on lampposts, though other configurations are possible in different embodiments. Multiple groups 16 are created around a track 8 to provide the complete coverage required. In this way, the complete set of tracking sensors 18 provided around a racing circuit 8 can be made to behave as a single group creating a single data stream for all the real cars in parallel whilst still achieving the low latency and concurrency required for interactive gaming.

Referring more specifically to FIG. 9, the sensors in each group are connected with a high performance, low latency communications link 86. Such communications links 86 use a suitable communications technology (which for ground-based sensors may be via a wired connection such as gigabit ethernet—with a data rate>900 Mbit/s, latency 100-500 μs or for ground-based or drone-mounted sensors may be wireless such as dual band Wi-Fi—data rate>90 Mb/s, latency 1-2 ms). Each group 16 of sensors is fitted with an onward communication node 88, typically as used in fibre optic ("wired") or wireless networks and often used for streaming telemetry data in motor racing sports. The onward communication node 88 is configured to communicate wired or wirelessly to the live event data capture server wherein the position data for all 24 cars is accumulated at a refresh rate of at least 25 Hz for onwards transmission. In addition, and depending from circuit to circuit on the de facto communication time delays around the network, the whole set of sensors, or each group of sensors 16, or in some embodiment each sensor 18, may be fitted with a GPS receiver so that a common, accurate time reference can be established across the sensor network. Accurate positional measurements for the cars 12 can then be time tagged enabling the live event data capture server 24 to aggregate car position data into the required contemporaneous sets even if this introduces a small time lag (<1 sec) into the onwards transmission to the gaming server 4.

There further follows, by way of example of the systems and methods in relation to interactive hybrid (real-virtual) gaming environment 46 provided by the present invention, a detailed description of the specific operation of the above non-limiting embodiment which is provided by reference to FIGS. 10a to 14.

In this example FIG. 10a shows the starting configuration of a Formula 1 motor race involving 24 real cars and drivers. Representations (89a, 89b, 89c, 89d, . . . 89x) of these real cars 12 are linked to a computer game with only one player, wherein a real car representation 89f has been allocated to or selected by the player as their starting position, such that the representation of their simulated car 90 exactly overlays the selected real car representation 89f.

According to FIG. 10a the first case described above involves a single computer game player controlling a simulated car 90 which at the start of the race is in the same position in the computer game as the real car 12f is in the real event. After the start of the race, the progress of the simulated car 90 is determined by the inputs the player makes to their computer equipment (gaming device/computer 2) and the simulations of the car and its environment by the gaming server 4. The progress of the real car representation 89 is determined by the inputs the driver makes to the real car 12 and the physical behavior of the extremely complex car 12 in its extremely complex environment. By virtue of either i) shortfalls in the fidelity of the simulations of the car and its environment or ii) differences of inputs between the player and driver, the progress of the simulated car 90 will diverge from that of the real car 12f. The present embodiment minimizes the former cause and thereby makes the competition between the real driver and the virtual player as fair, realistic, and enjoyable as possible.

It is one of the principal features of the methods of the described embodiments that whilst the simulated car 90 remains sufficiently close to the real car representation 89f, to within tolerances that can be defined in a number of ways (the following description will refer to the simulated car 90 as being 'snapped' to the real car representation 89), the computer game will show particular behaviours and have increased interactions with the real car 12, possibly including but not limited to;

a) the real car representation 89 will not be displayed and will not interact with the player's simulated car 90 as part of the snapped player's game;
 b) the snapped player's car 90 will be 'digitally twinned' with a real car representation 89, the simulated car 90 replicating the performance of the real car representation 89 sufficiently closely for the competition between driver and player to be fair;
 c) the inputs (control data 26) of the real driver (steering, accelerator, gear selection, etc) will be able to be streamed and available to the interactive hybrid environment generated by the gaming server in real time;
 d) audio, video and other data feeds from the real car 12, its driver and the wider racing team could be streamed to the computer game (interactive hybrid environment) generated by the gaming server in real time;
 e) the audio, video and other data feeds from the snapped player could be available in the reverse direction to the real car 12 and/or team and/or to other computer gamers.

FIG. 10b shows a racing situation where the player's simulated car 90 has diverged in instantaneous position and possibly other attributes such as speed, velocity and acceleration from the real car representation 89f by known amounts. Here a simple non-limiting method of defining when a player's car 90 is snapped to a real car representation 89f is illustrated. Within the computer game software running on the gaming server 4, the position on the racetrack of a reference point 94f on the real car representation 89f is used to define a region of proximity 96f, in this case a rectangular box. If the position of an equivalent reference point 91 on the simulated car 90 falls within the region of proximity 96f, then the player's car is 'snapped' to the real car representation 89f.

There are many other possible snapping methods that might depend on other parameters such as how far behind or ahead in time the player's car representation 90 is with respect to the real car representation 89 (as used in the F1 'Drag Reduction System (DRS)' where a chasing car can achieve a 'boost' if it is within a specified range of the car in front). Other snapping methods may include speed, velocity vectors, angular momentum, . . . but the principle is clear. In addition, the computer game AI engine 48 may use algorithmic or other strategies to implement degrees of 'stiction' that provide more flexible tolerances such that snapping is not subject to jitter and, where systems of handicapping are employed, higher ranked players may be given less "AI assistance" than lower ranked players. Furthermore, when 'un-snapping' from a real car representation 89 the game software running on the gaming server may take into account the proximity of other player's virtual cars.

When a player's simulated car 90 is not snapped to any of the representations of the 24 real cars in the race, all of the representations of the cars are displayed in the computer game in the traditional way. When a player's simulated car 90 is snapped to a real car representation 89 then only the other 23 real car representations 89 are displayed to that player and the player is likely to feel as if they are driving the real car and interacting very engagingly with the real driver and their race team, particularly if live audio feeds are provided from the team to the player.

This method of snapping enables a player to progress throughout a race either by avoiding real car representations 89 or by moving from real car representation 89 to real car representation 89 snapping with them (or not as the player chooses by their manoeuvres). FIG. 11a shows a racing situation at a point in time not long after the start of a race. Here the simulated car 90 is somewhat in between three nearest real car representations 89c, 89b, 89e. The player's simulated car 90 has become un-snapped from its original twin (race car representation 89f) by out-performing it and is now ahead of it. The real car representations nearest to the player's virtual car are now real car representations 89b, 89c, and 89e. Depending on the skill and actions of the player and those of the three real drivers, the positional relations 98b, 98c and 98e will evolve quickly. At the time of FIG. 11a the computer game (virtual race simulation) displays real car representation 89c in front of the player's car 90 and displays real car representation 89e in its rear-view mirrors.

FIG. 11b shows a continuation of the racing situation of FIG. 11a at a slightly later time where the simulated car 90 and has gained ground on and come close to the real car representation 89c. The simulated car 90 is shown to have entered its proximity zone 96c of the real car representation 89c and is now snapped to it. The gaming server now prevents the real car representation 89c from being displayed on the player's screen and features such as those described above are enabled.

Figure 11C:
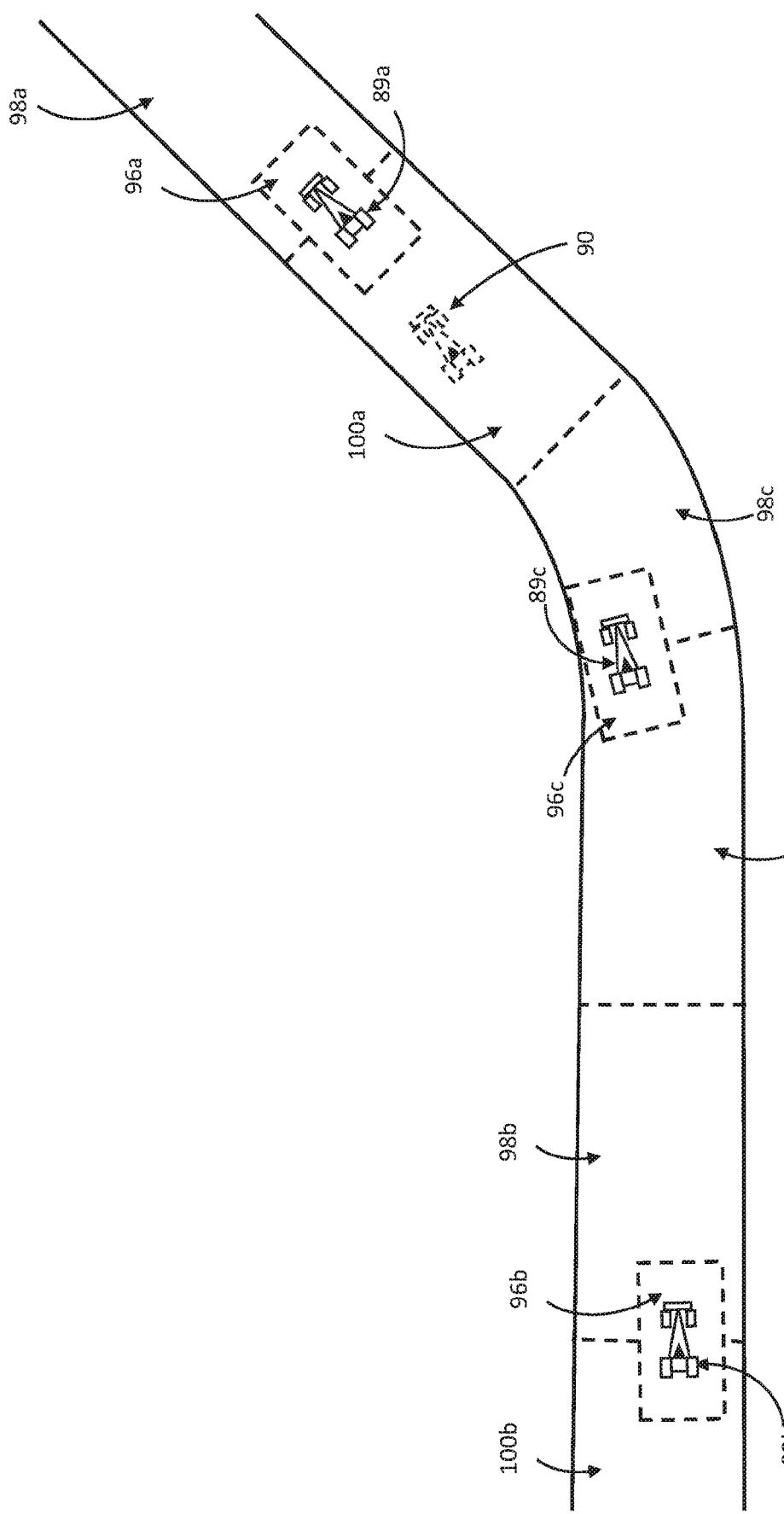
FIG. 11c is a schematic plan view of the racing situation of FIG. 11b after a longer time interval and at another part of the circuit where the simulated car is closing on the leading real car representation.

FIG. 11c shows a further continuation of the racing situation of FIG. 11b after a longer time interval and at another part of the circuit 8 where the simulated car 90 is now designated and is closing on the leading real car representation 89a. Here it can be seen that the simulated car 90 of the computer game player has moved well ahead of real car representation 89c and is more than halfway between real car representation 89c and the race leader real car representation 89a. However, the player's virtual car 90 has not yet reached the snap zone 96a of the real car representation 89a and is chasing it. This figure introduces two further zones around each real car representation 89.

The first zone 98*a* is in front of the real car representation 89*a* and is called the "chased zone" and the second zone 100*a* is behind the real car representation 89*a* and is called the "chasing zone". Together the three zones 96*a*, 98*a* 100*a* may form a contiguous set, as illustrated in FIG. 11*c*, whereby when the simulated car 100 is in any of the three zones associated with a real car representation 89 that it is digitally twinned in terms of the performance of the simulated car 90 being a very close match to that of the real car representation. This feature equalizes the chances of the virtual car 90 chasing the real car representation 89 or vice versa and enables a natural integration with real-life features such as DRS. So, the simulated car 90 is now in the chasing zone 100*a* of the real car representation 89*a*. As soon the simulated car 90 moves from chased zone 98*c* of real car representation 96*c* to chasing zone 100*a* of real car 89*a* its performance characteristics are switched between those of real car representation 89*c* and those of real car representation 89*a*. This means that the performance of the simulated car 90 is always matched to the real car representation 89 it is most closely interacting and competing with, ensuring a fair competition based on driving skills alone between the computer game player and the real drivers. This method of zoning is illustrative of the principle of zoning and there may be several possible variations on the method.

As stated above, there may be more than one computer game player involved in the race simulation that is linked to the live, or recorded, race. In prior art motor sports computer games, it is commonplace for a number of players, from one up to the number of real normal participants in a real race, to play together online, wherever in the world they are located. So, in a comparative prior art implementation of the above Formula 1 example it would be usual for up to 24 players to play, each taking a place on the starting grid, with any unfilled places being occupied by simulated cars that are controlled by the algorithms and AI of the game software. This type of limited player gaming mode would still be possible in the current embodiment. However, in other embodiments described below, it is possible to implement other gaming modes not limited by the number of players. According to the above-described embodiment of the present invention, it is possible to implement the above-described limited player gaming mode where the unfilled player places are allocated to real car representations 89 in the real race and their data streamed live from the event would control their behaviours in the game. In this case, there would always be 24 drivers and/or players represented in the computer game, a number of computer players, say 'n', would be competing amongst '24-n' real cars. All aspects of the 'chase & snap' methods described above would be applicable and the performance of each car simulation 90 would be twinned with that of the real car representation 89 it replaced on the starting grid, except when it was in the 'chase & snap' zones of the real car representations 89 that are represented in the race.

According to an alternative embodiment implementing a limited player gaming mode, there would be 24 game players and 24 real drivers and whenever a player's virtual car 90 is not snapped to a real car representation 89, their virtual car 90 would appear in the computer game environment and be visible to and interact with all other players virtual cars 90. Hence there would be 24 real car representations and anywhere from 0 to 24 unsnapped, simulated cars 90 visible in the computer race simulation at any one time. These two method variants in this gaming mode are illustrative, there are many other possible variants, but the principle of the method is clear.

In many types of motorised sports (Formula 1 is merely an example of the much more general applicability of the present invention) real cars can take time out of the race for maintenance or modification actions, for example damage repair, refuelling, or fitting new tyres. Accordingly, in the present embodiments, the computer game player can elect to take the same time out of the race for a simulated version of the same maintenance or modification actions as the real car, in which case the game player's simulated car 90 inherits the changed performance characteristics of the real car representation 89. Alternatively, when the computer game player's car 90 is not snapped with a real car representation 89 the computer game player can elect to take time out of the race for simulated maintenance or modification actions which, on returning to the real race, will qualify the computer game player's car 90 to link with any real car representation 89 that has had similar or compatible maintenance or modification actions. This is one of a number of possible implementations of the method of ensuring that the competition remains fair when real cars can undergo maintenance or modification during a race.

As mentioned above, it is possible to implement other gaming modes not limited by the number of players. One such embodiment which is in line with the situation described above in where there are a very large number of computer game players involved in the game whilst the game is linked to a live or recorded real event, is now described. Just one example of such a situation is in a massive esports race wherein it is required for each player to interact in a realistic, engaging, and challenging manner with the real race and for there to be a fair method of ranking the very large number of players in terms of their performance and finishing position in the esports event.

Figure 12A:
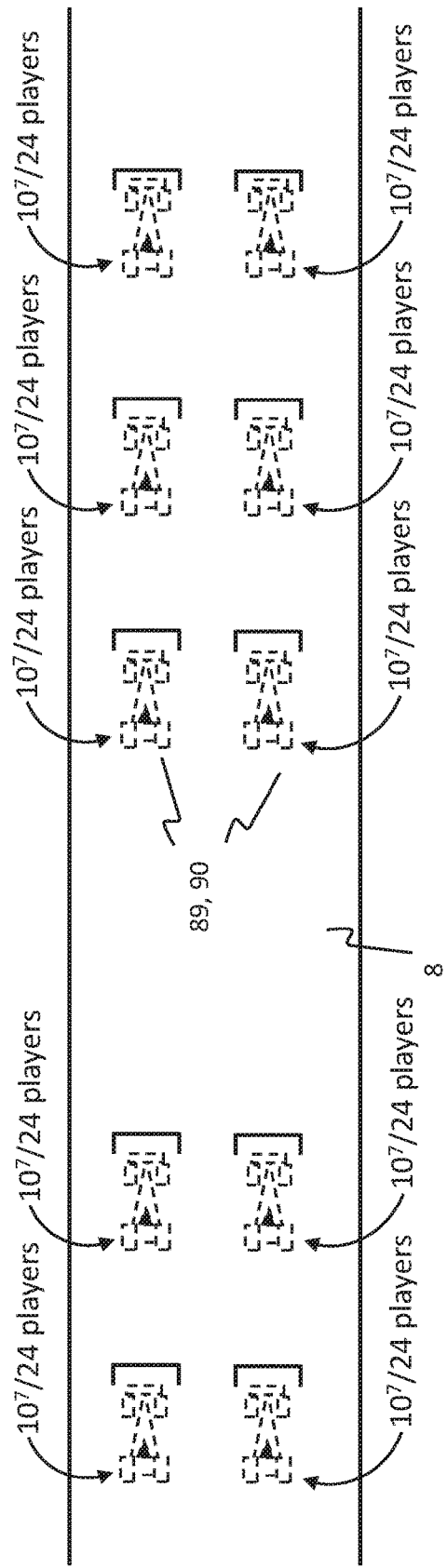
FIG. 12a is a schematic plan view of a starting grid showing the starting configuration for a race involving 24 real cars live-linked to and integrated with an esports or on-line gaming race with ten million video game players equally distributed amongst the starting positions.
Figure 12B:
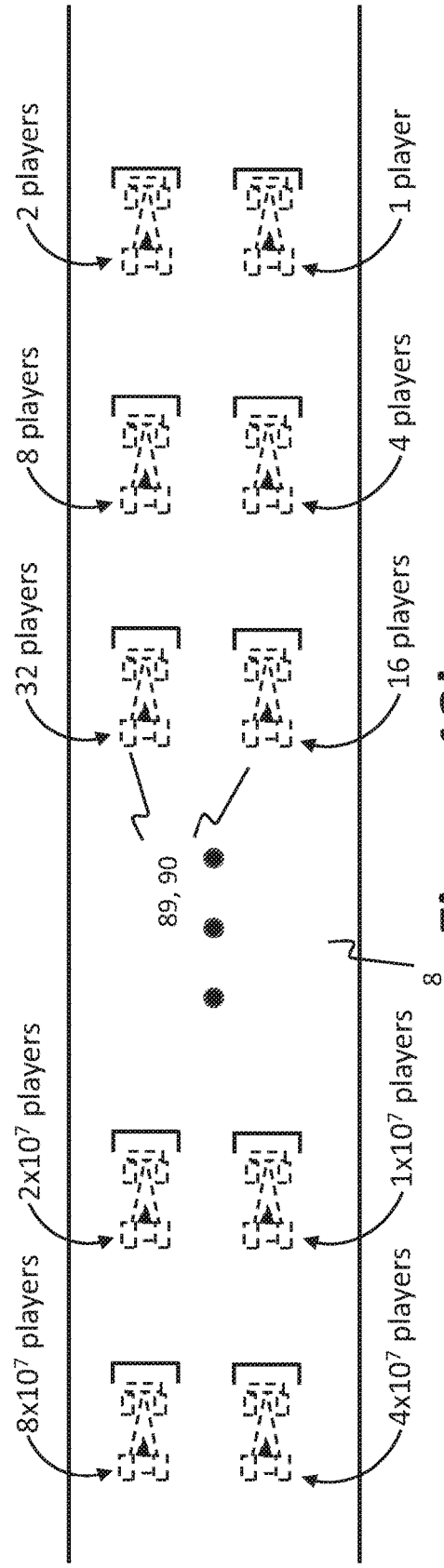
FIG. 12b is a schematic plan view of a starting grid showing an alternative starting configuration to that shown in FIG. 12a with over one hundred million video game players distributed logarithmically so that only the highest ranked virtual car is linked with the leading real car.

FIGS. 12*a* and 12*b* show two examples of possible starting configurations for a race involving 24 real cars live-linked to and interacting with an esports or on-line gaming race involving tens of millions of game players whose starting positions are distributed amongst the starting positions of the real cars. More specifically, FIG. 12*a* shows the starting configuration for a race where the 24 real cars are linked to ten million video game players equally distributed amongst the starting positions. FIG. 12*b* shows an alternative starting configuration to that shown in FIG. 12*a* with over one hundred million video game players distributed logarithmically over the 24 real car representations, so that only the highest ranked virtual car 90 is linked with the leading real car representation 89. These gaming modes are termed limitless player gaming modes. These examples are just two of many similar options; for the purposes of the methods of the present embodiments it is necessary only that every participating computer game player is allocated to one of the cars. Hence every player starts the race snapped to one of the real car representations. Every player snapped to the same real car representation 89 is digitally twinned to that real car and has an identical performance model for the real car representation 89 in its environment.

Figure 13:
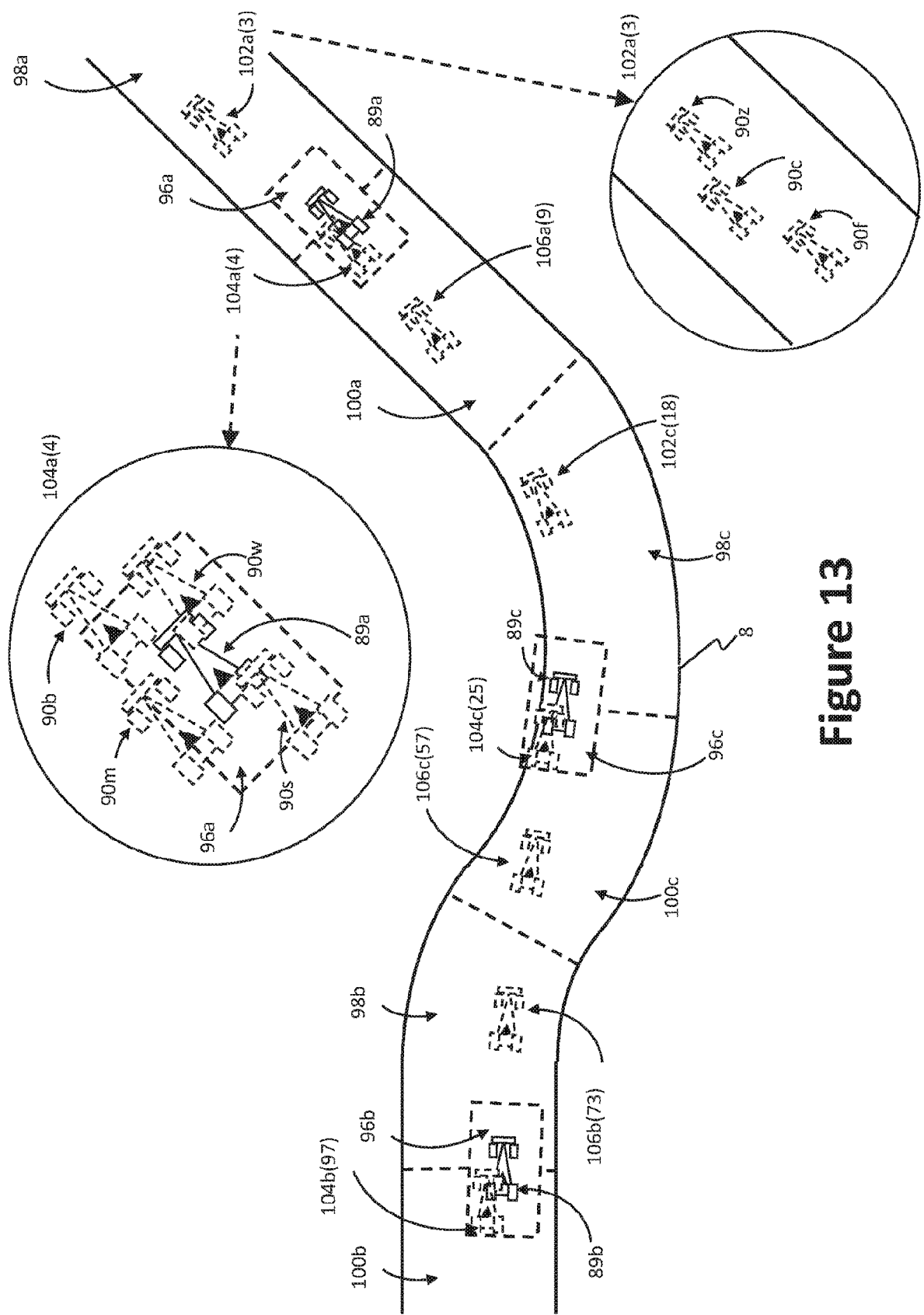
FIG. 13 shows a racing situation part way through a race with 24 real cars and a large number of computer game players each respectively linked to a real car.

FIG. 13 shows a racing situation part way through a race with 24 real cars and a large numbers of computer game players each having their virtual car 90 respectively linked to a real car representation 89. The real race situation of FIG. 13 is similar to that in FIG. 11*c* where real car representation 89*a* is in the lead followed by real car representation 89*c* in second place and real car representation 89*b* in third place. Each computer game player experiences the race in an almost identical manner to that described above for a single player interacting with representations of the 24 real cars. The situation shown in FIG. 13 is that the simulated cars 90 of three players 102*a*(3) are in zone 98*a* ahead of the leader (real car representation 89*a*), illustrated both by a single dashed car on the track and in the expanded view as three individual simulated cars 90*c*, 90*f*, 90*z*, in specific, precise and closely separated positions. In this leading zone, each player could be displayed with information on and/or a representation of some or all of the other players in the zone to promote an interactive competition for the leading positions. Four cars 104*a*(4) are in the snap zone 96*a* of the real car representation 89*a* and are snapped that real car representation 89*a*. They are shown in FIG. 13 as a single dashed car on the track 8 and, in the expanded view, as four individual dashed car representations 90*b*, 90*m*, 90*w*, 90*s*, each at its precise position in the game in relation to real car representation 89*a*. Nine players 106*a*(9) are in the chasing zone 100*a* of real car representation 89*a*. All simulated cars in zones 96*a*, 98*a* and 100*a* are digitally twinned to real car representation 89*a*. Real car representation 89*c* has snap zone 96*c* with twenty-five cars 104*c*(25) currently snapped, chased zone 98*c* containing eighteen players 102*c*(18) and chasing zone 100*c* containing fifty-seven players 106*c*(57), all digitally twinned to real car representation 89*c*. In the chased and chasing zones each player's virtual car 90 can be displayed with information on and/or a representation of some or all of the other players who have their virtual cars 90 in the same zone to promote an interactive competition amongst virtual players in the chased and chasing zones 98, 100. This method of representation advantageously enables a great deal of player information to be provided within a small screen size to enable gaming devices with small screen sizes to be able to maximize the amount of information displayed. Should a real car crash out of the real race, the snapped virtual cars 90 would follow suit provided their player's input commands were not such as to mitigate and avoid the crash, as determined by reference to the black box model, otherwise they would continue as an un-snapped car 90 from the point they successfully deviated.

Hence in this limitless player mode, the above-described method conveniently provides for any number of computer game players to interact with the live race and each experience the event 10 and compete with the whole field of real cars in an engaging and exciting way. This is enabled by every player's gaming device 2 receiving the live data stream of the real cars' progress around the circuit and driver inputs (within the virtual race simulation) and, if appropriate, with other data streams such as team audio and driver video. In addition, where the players are participating in a mass engagement live-linked race, the progress of every player around the circuit is typically communicated and brought together in the central gaming server 4. This enables the viewpoint illustrated in FIG. 13 to be assembled for the whole circuit 8 and analysed in real time such that the relative positions in the race of the virtual cars 90 of large numbers of players can be monitored continuously and to any degree of accuracy (for example the computer game software simulation could represent the instantaneous position of any simulated car at any time to any desired accuracy). This then enables:

a) the final positions of all players at the end of the race to be unambiguously and fairly determined, and b) in circumstances where the competition between computer game players could be enhanced, then an individual player could be presented with the images of the cars of other relevant players in the vicinity as described above.

In addition, the computer game of every player can exhibit behaviours and interactions with the real event 10 but enhanced by the mass engagement of many players. For example, as well as the live audio feeds of the real driver and team being streamed to all snapped players, the number of snapped, chasing and chased players could be presented to the real team, or a mass audience of observers, or even the real driver, as could the names of individual players so that the real driver could comment to any or all of the snapped drivers, and selected snapped drivers could comment back (subject of course to this being assessed as acceptable from a safety perspective). There are potentially many other immersive entertainment features like this that are enabled by the present embodiments.

In a live-linked event 10 with mass engagement of computer game players, depending on how it has been organised, there is likely to be a wide range of levels of skill in the population of game players. The current embodiments can easily be extended to allow 'all-corners' or 'open' events by including a handicap parameter for each player, as mentioned above, (based like all handicap systems on a fair assessment of previous experience). For example, each player could have achieved a handicap between 0 and 100, with 0 representing professional gamer status and 100 novice gamer status. Handicap 0 would mean that the AI Engine 48 of the gaming server 4 gives no support in the game when taking the player's inputs and translating them into their virtual car's progress round the circuit 8, whereas handicap of 5 could mean that if the player's data inputs 38 are within 5% of the real driver's 26 then they are considered as matching, etc.

All of the above-described methods are able advantageously to present the following characteristic namely that the computer game simulation of the real car's performance in its environment can represent a fair and enjoyable contest not only between the game players but between the game players and the real drivers. In other words, when the game player makes equivalent simulated inputs 38 to the simulated car as the real driver makes real control inputs 26 to the real car, then the progress of the simulated car 90 will match that of the real car representation 89 to an acceptable accuracy. Achieving a high level of fidelity has been the objective of motor car racing computer game development and professional simulators for many years and there is a significant capability already. However, for mass engagement live-linked events there will be many factors in play at any event that would need to be measured and communicated to the computer game and realistically accounted for in the computer game algorithms and AI. As described above, there is prior art that suggests transmitting many such measurements live to the computer game to enhance traditional, physics model-based simulations. An alternative and preferable approach is realised in the final embodiment described below and is summarised in its nature as a method of 'real-time, dynamic black-box simulation for real-virtual interaction'.

Figure 14:
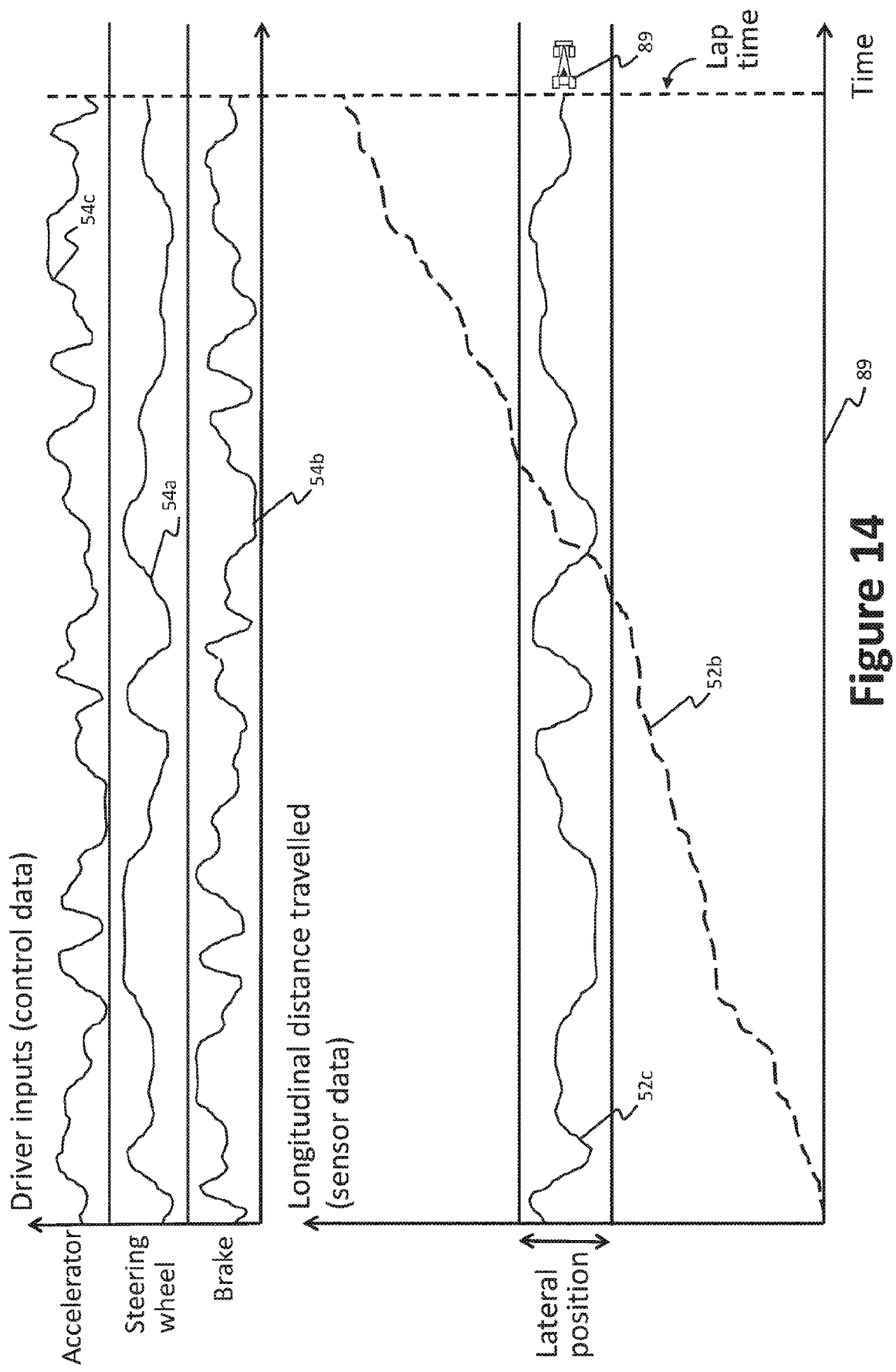
FIG. 14 is a graph over time of various parameters transmitted by the live event data capture server to illustrate the principles of the method of black box dynamic simulation.

The present embodiments can implement a dynamic black-box simulation model within a computer game that is linked to a live event. In these embodiments, in addition to the computer game being provided with accurate positional data 22 for a real car in real-time via the positional data capture system 20 shown in FIG. 1, the control inputs 26 made by the real driver to the real car 12 are also measured and transmitted in real-time to the gaming server 4. FIG. 14 is a graph over time of various parameters 28 transmitted by the Live Event Data Capture Server 24 to illustrate the principles of the method of black box dynamic simulation.

Referring to FIG. 14, the present embodiments use a dynamic black-box simulation model in real-time for an illustrative and simplified set of driver inputs (control inputs) to a real car—namely steering wheel position 54a, accelerator position 54c and brake pedal position 54b—in reality there may be more driver inputs such as gear change (not shown in FIG. 14). These are the dynamic data inputs to the black-box model. The dynamic outputs from the black-box model are the progress of the real car 89 in terms of position with time; in this example model they are illustrated as longitudinal distance travelled 52b and lateral position 52c on the track 8. FIG. 5 shows variations in driver inputs can be matched to variations in outputs of track position/location of the real car 89 over time. Recording and correlating the time-history of the inputs and outputs over one lap gives the simplest version of a black-box dynamic model for one lap, which then can be used for determining the likely track position of the virtual car 90 on the basis of the user's computer-generated inputs 38.

Figure 15:
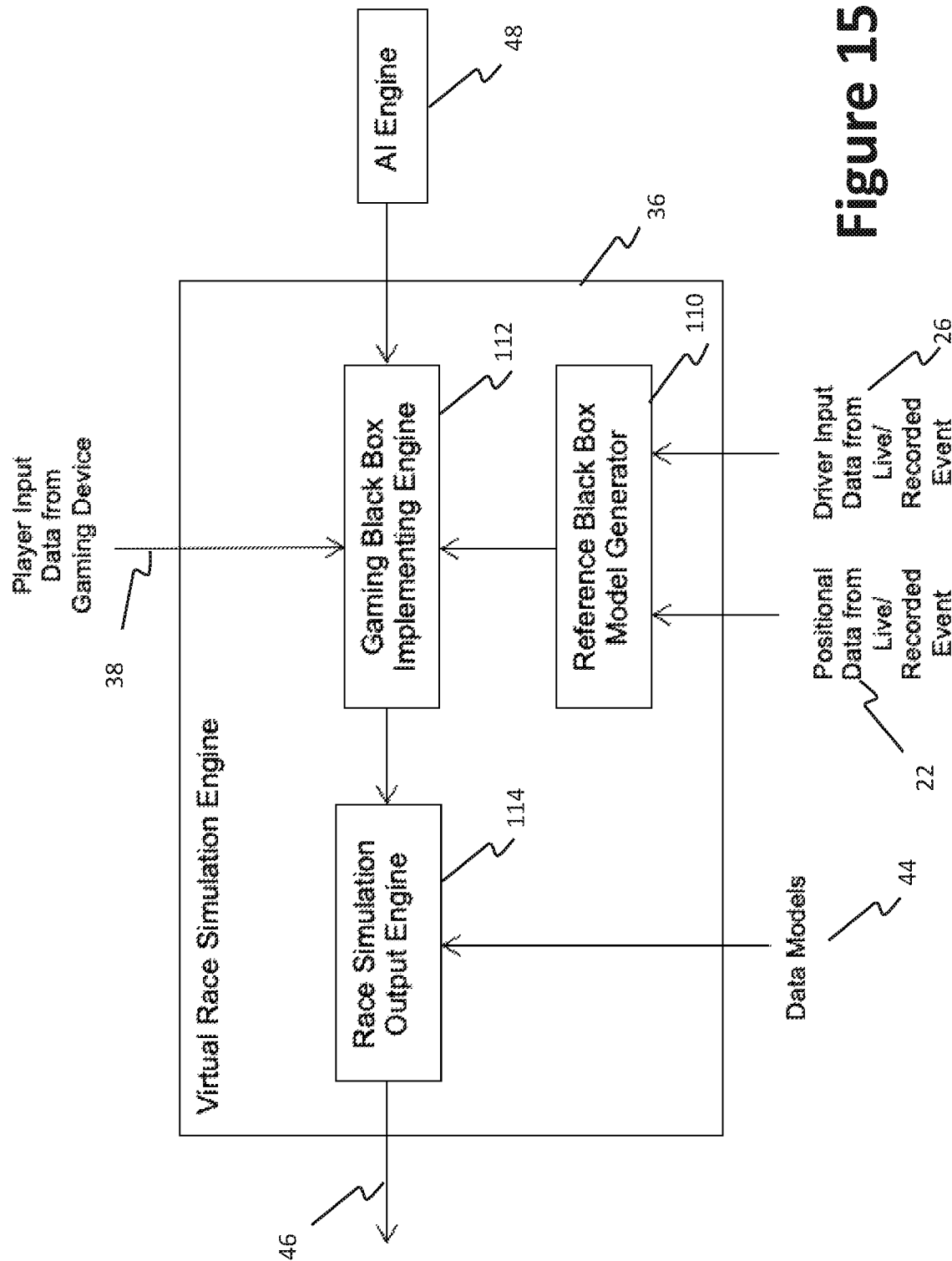
FIG. 15 is a schematic diagram showing the virtual race simulation engine of FIG. 2 in greater detail.

The present embodiment is based on the race simulation occurring at the central server 4. In this case, an example of how the virtual race simulation engine 36 implements the dynamic black box simulation is now described and is shown in FIG. 15. The kinematic race positional data 22 is matched to real driver inputs 26 from either a live or recorded event 10 by a reference black box model generator 110 (mentioned earlier). The output of this is provided to a gaming black box implementing generator 112 which in turn uses this reference to determine the effect of the player input data (driving commands) 38 has on the position of the virtual vehicle 90 which they are controlling in the race. In effect the reference black box generator defines a transfer function of inputs to outputs which can be used by the gaming black box implementing engine 112. The AI engine 48 is also provided to aid the player in competing with a professional driver of the real vehicle as has been described above. Once the position of the virtual vehicle 90 has been determined by the gaming black box implementing engine 112, it is passed to the race simulation output engine 114, which uses it to generate a representation 90 of that vehicle in the race. The interactive hybrid race environment of all the vehicles 89, 90 racing is generated by the race simulation output engine 114 which uses the stored data models 44 and outputs the virtual race environment 46 to all the relevant gaming devices 2.

The black-box dynamic model minimizes the need to create sophisticated 'white-box' models (i.e., models that combine more detailed models based on complex physics which in turn combine more detailed models . . . ) of the extremely complicated and dynamically changing car in its extremely complicated and dynamically changing environment. So, complex factors which are impossible to measure and model dynamically such as the wear and tear in the machine, the deposition of tyre compound on the track surface affecting wheel adhesion, the gusting of wind that affects the aerodynamics of the car's progress (to name but three of many) are all wrapped up in the reality of the measured black-box model. The measured black-box model, created by the reference black box generator 110, then acts as a reference model for the AI algorithms of the AI engine 48 in the game which, given inputs 38 by the computer game player that vary from the reference model inputs, will vary the outputs commensurately, proportionately, and realistically.

The black-box model for one car will be different from lap to lap due to significant variations in driver inputs from lap to lap and the (usually continuous and gradual, occasionally discrete) variations in other physical factors. However, there are many detailed strategies and techniques that can be used with the present embodiments to ensure this method provides the best, dynamically accurate simulation throughout the race, including but not limited to:

i. averaging or otherwise combining black-box model data from multiple laps over practice sessions and the real race to create a reference black-box lap model best representing the driver, car and track on the day;

ii. doing the same as a) but over shorter sections of the track, for example a specific corner or a particular straight;

iii. taking the lap with the best lap time as the reference black-box model for the ultimate performance of the driver, car and track on the day;

iv. doing the same as c) but over shorter sections of the track, for example a specific corner or a particular straight;

v. building the black-box model second by second, comparing game player inputs 38 to real driver inputs 26 and conditioning the outputs in direct and immediate response (this method would be particularly useful on the first lap, when there is no history available, or in the first lap after a "pit stop" and hence modification of the real car);

vi. supplementing the measured black-box model with modelling of known physical laws where continuity and relative simplicity is known to apply;

vii. modelling known limitations on the performance of the car, for example maximum straight-line acceleration, top straight-line speed, etc There are many other techniques, but the essence of this method is that it is far more practical to model and simulate in terms of variations around one or more dynamic black-box reference models that are known to be valid than it is to create white-box models of extraordinarily complex physical systems in real time.

As well as live linking to real motor sports events 10, other embodiments of the present invention are also applicable to a situation where the interaction of the computer games players is with a recorded version 42 of a previous live race, the recording 42 consisting of the highly accurate, measured kinematic performance 22 of the real cars 89 in the environment of the previous race and the inputs 26 of the real drivers to the real cars throughout that race. In these embodiments, all of the description above can apply to the engagement of computer game players with the recorded race.

Alternatively, in another embodiment, where the recording 42 of the real race consists only of the highly accurate, measured kinematic performance 22 of the real cars 89 in the environment, but no record of the inputs 26 of the real drivers, the digital twinning could then be based on any other method that ensures that the simulated performance of the game player's car 90 in its environment is a sufficiently close representation of the performance of the real car 89 in its environment as to create a fair competition between the game player and the real driver or an autonomous car. This may involve, for example, the reverse engineering of the driver inputs 26 using a high-fidelity racing car simulator with the driver rehearsing and then recording the input histories that enable the driver to reproduce the performance of each real car 89 in the recorded race. This is one illustrative example of a method for reconstructing the inputs 26 to the dynamic black-box model when the data from the original event is not available.

Figure 16:
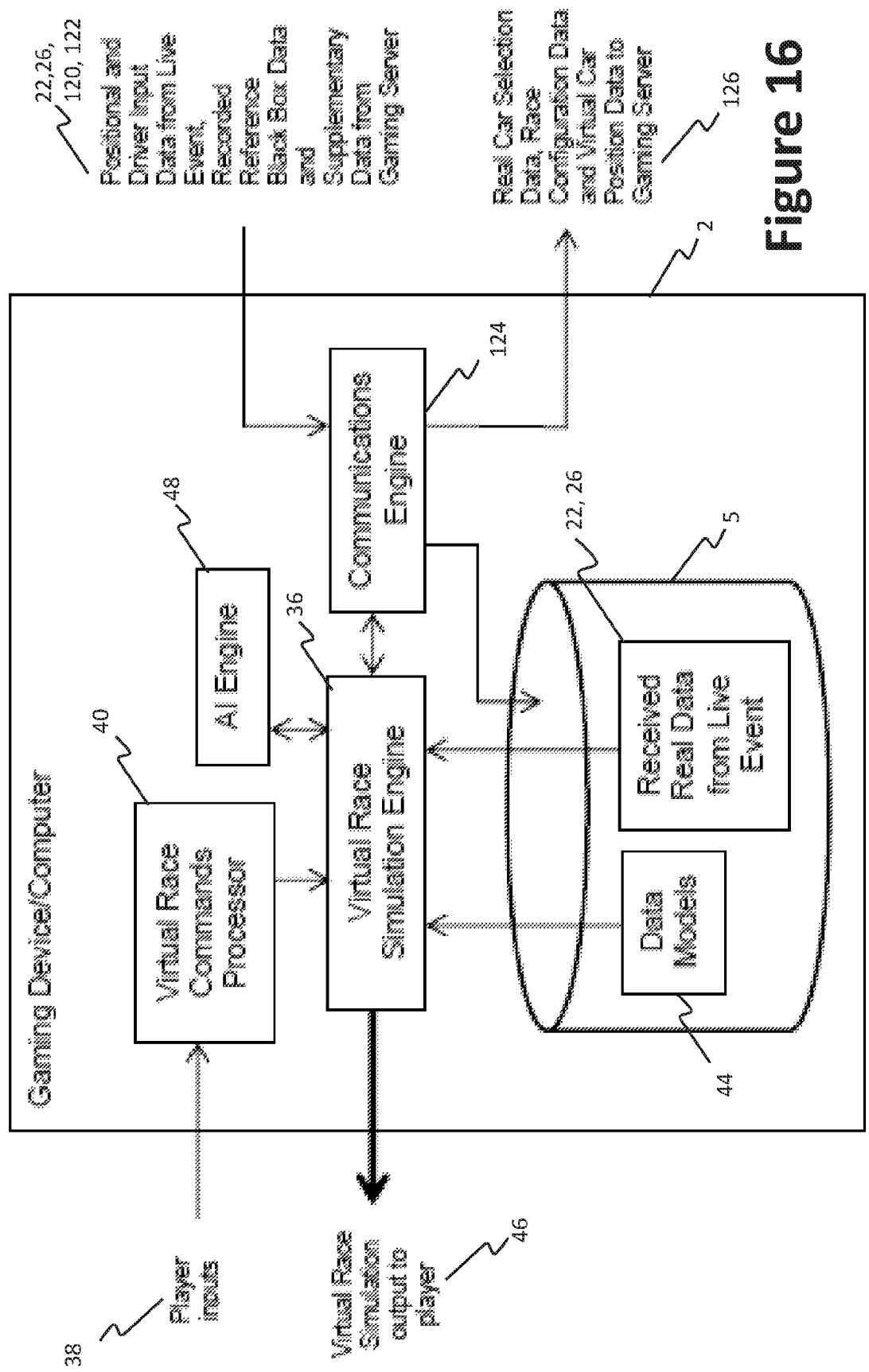
FIG. 16 is a schematic block diagram showing the gaming device of FIG. 1 of a distributed processing system according to a further alternative embodiment.

Referring now to FIGS. 16 to 20, there is described a further embodiment of the present invention which primarily differs from the above-described embodiment by being implemented in a more distributed manner. There are many components of the further embodiment which operate in a similar manner to that of the embodiment of FIGS. 1 to 4 and to avoid unnecessary repetition only the differences will be discussed herein. Referring to FIG. 16, the configuration of the gaming device 2 is shown. Here the virtual race simulation engine 36 is provided in the gaming device 2 rather than the central server 4, such that the player input commands 38 derived from player inputs can be input directly into the virtual race simulation engine 36 without having to be transmitted to the central server 4. This greatly improves efficiency and bandwidth consumption. The virtual race simulation engine 36 is provided with at least the positional data 22 and driver input data 26 of the real cars 89 from the live event 10, recorded reference black box data 120 and supplementary data 122 from the gaming server 4, via the communications engine 124. This received data is stored in a local data store 5 and used by the virtual race simulation engine 36 in a similar manner to that described above in the embodiment of FIG. 2. Similarly, data models 44 provide further support for the generation of a simulated race environment 46. An Al engine 48 is provided to provide assistance for the player to help them to compete with a real driver as has been explained previously. One consequence of having a more distributed approach to virtual race simulation is that the central server 4 has to be updated with the position of each player's virtual vehicle 90. Accordingly, the communications engine 124 is arranged to transmit not only the race car selection 126 for the start of the race and any changes 126 to it throughout the race but also virtual vehicle position data 126 as determined by the virtual race simulation engine 36 to the central gaming server 4 during the race.

Figure 17:
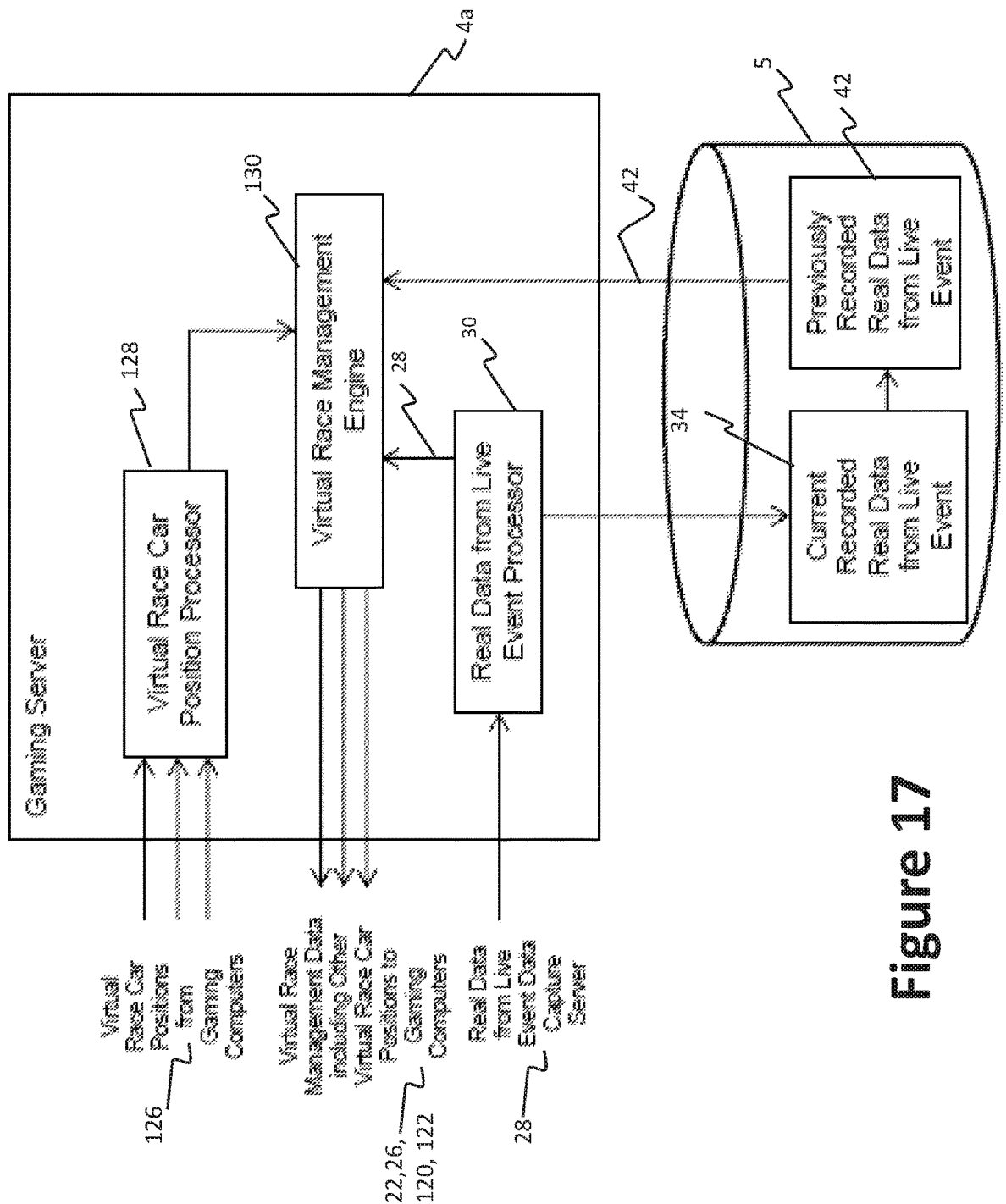
FIG. 17 is a schematic block diagram showing the gaming server of FIG. 1 of a distributed processing system for use with the gaming device of FIG. 16.

Referring now to FIG. 17, the gaming server 4a of this distributed embodiment is shown. The gaming server 4a has a virtual vehicle position processor 128 which collates each virtual vehicle position 90 and provides this to a virtual race management engine 130. The virtual race management engine 130 then provides each gaming device 2 with information on their position and relative performance in the race and possibly (where it determines the race amongst the virtual players will be enhanced or made more competitive), the positions of other virtual vehicles 90 in the race to complete the racing environment. The virtual race management engine 130 can also generate a reference black box for previously recorded data 42 and provide this to all of the gaming devices 2. As this is pre-recorded data 42, the information can be provided not in the time critical manner which would be associated with real-time racing. The gaming server 4a then only deals with oversight of the competition as it sees the positions of all the competitors—virtual and real, possibly feeding telemetry and other data to 'snapped' cars (so needs a link from the live event data capture server 24), possibly feeding selected competing visuals to each virtual competitor, possibly feeding statistics on the virtual competition to the real teams, etc.

Also, the real live event data 28 is in this embodiment routed from the live event data capture server 24 to the gaming server 4a from where it is distributed to the gaming devices 2. This has advantages for synchronisation. However, in another embodiment, the real live event data can be routed to each of the gaming devices 2 directly which has the advantage of reducing latency and reduces required processing power at the central server.

Figure 18A:
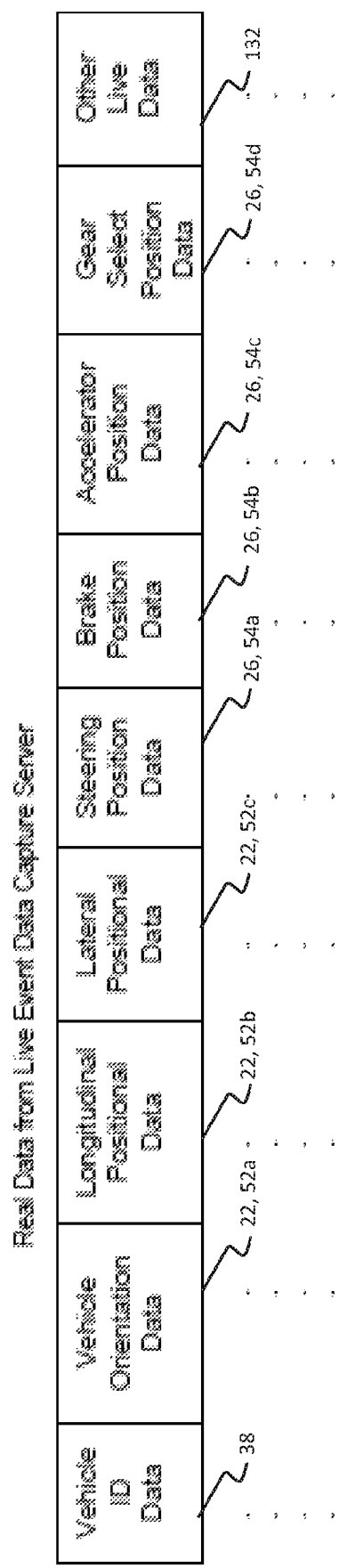
FIG. 18a is a schematic block diagram showing the format of real data received from the live event data capture system for use in the gaming device of FIG. 16.

FIG. 18a shows the data from the live event data capture server 24 and the virtual car position data which is received at the gaming server 4a from the gaming device 2. Whilst FIGS. 8a and 13a are very similar, in this embodiment other data 132 is also provided to the central server 4a. This other data 132 can be live telemetry data, radio communications data between the teams and the driver etc. these additional data streams 132 can make the gaming more realistic or engaging as has been described above.

Figure 18B:
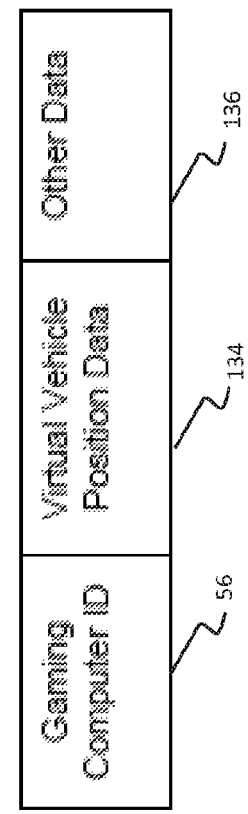
FIG. 18b is a schematic block diagram showing the format of virtual car position data received from the gaming device of FIG. 16.

FIG. 18b shows the virtual car position data 134 which is sent to the gaming server 4a from the gaming device 2. The data also includes the gaming computer identifier 56. This position data 134 is used to update the position of a virtual vehicle 90 such that that position can be communicated as determined by the gaming server 4a to other participants in the same race using other gaming devices 2. The other data field 136 relates to other data such as the selection of the real vehicle to be associated with or handicap data.

Referring now to FIG. 19, the virtual race management engine 130 within the gaming server 4a is shown. The virtual race management engine 130 determines which gaming devices 2 are to receive which updated position data 38. At its heart is a race engine management processor 140, which can assemble a picture of the race from the different data streams provided to the central server 4a. In addition, the virtual race management engine 130 comprises a reference black box model generator 142 which is the same as that described in the above embodiment with reference to FIG. 15, with the exception that it is only operative on previously recorded event data 42. The live data reference black box model generation is devolved to each gaming device 2. The communications engine 144 provides the position data 38 and the reference black box model data 146 to each of the appropriate gaming devices 2. In addition, the communications engine 144 can also provide the other race data 132 (as mentioned above) to each of the gaming devices 2 as well as route through the live event data if it is not being provided directly to each gaming device 2.

Figure 20:
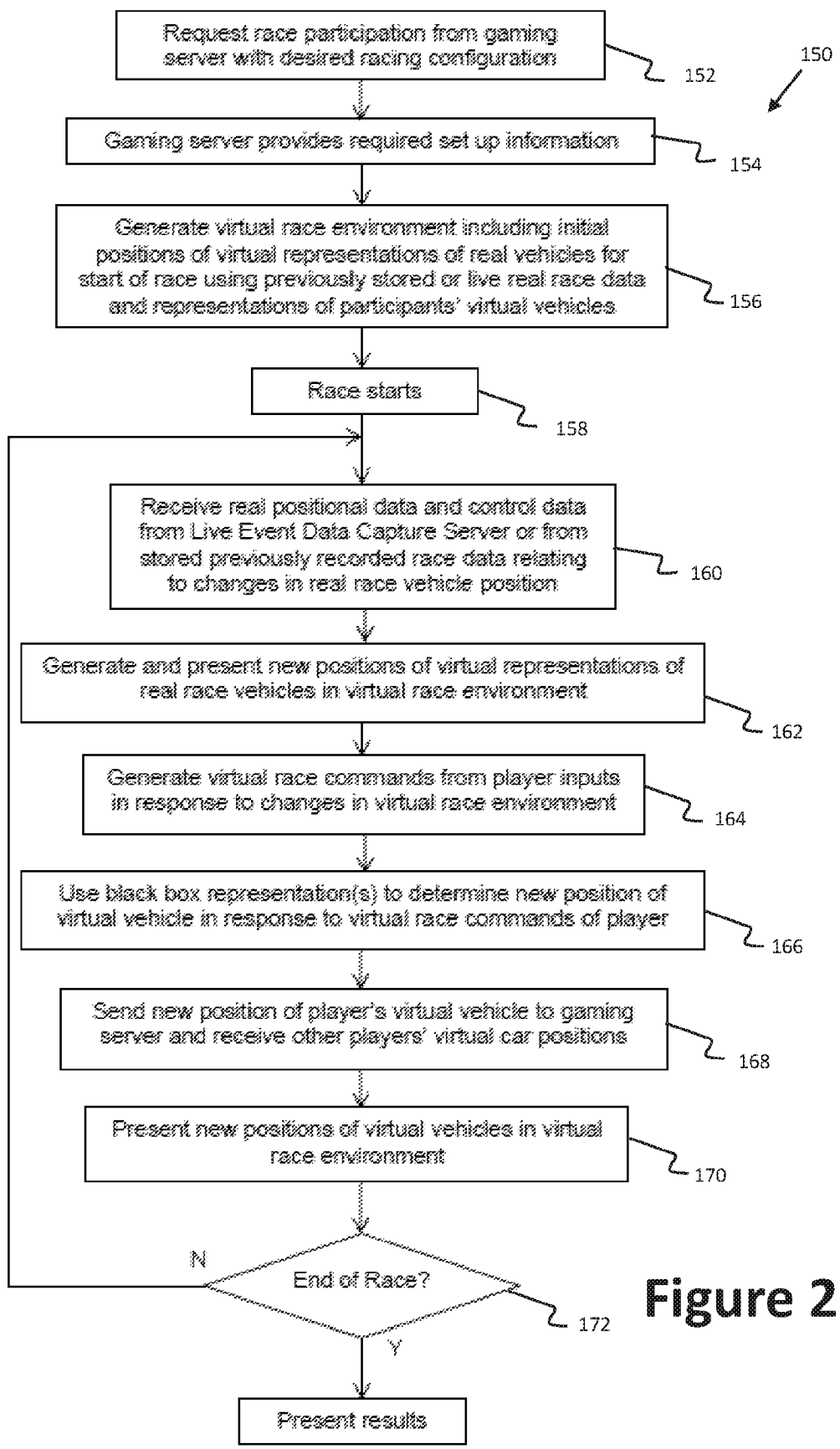
FIG. 20 is a flow diagram showing a method of operation of the gaming device of FIG. 16.

Referring to FIG. 20, a method of operation 150 of the system of this embodiment at the gaming device 2 is shown. The method 150 commences with the gaming device sending at Step 152, a request for race participation to the gaming server 4a. The request can include specific configuration details which enable game server 4a to interact with the gaming device 2 and can also specify the real vehicle 89 to which the player of that device 2 will be linked. For example, if the gaming device 2 requires a direct feed of live data from the live event data capture server 24 and/or a live telematics feed 26, these gaming options can be specified. In the next step, the gaming server provides at Step 154, the required information such as a link to the live data feed from the live event data capture server 24 and the positions of the other virtual players 90 in the race where determined by the virtual race management engine 130. Whilst not shown, the gaming server 4a appraised with this information, is able to create an overall picture of the active gaming devices 2 assigned to a particular event 10. As with the earlier described embodiment, a single real vehicle 89 can have multiple players assigned to it. Following this, a virtual race environment is generated at Step 156, locally on the gaming device including the initial positions of the virtual representations 89 of the real vehicles. As mentioned earlier this can be based on either live data 28 from the live event or prerecorded data 42 from a previously recorded live event. Data models 44 stored in a local data store 5 are used to generate the virtual race environment. Once the race commences at Step 158, a stream of data 28, 42 from the live event or from the prerecorded event is received at Step 160, and using this, the positions of the representations of the real race vehicles can be changed at Step 162. These new positions are used to generate at Step 160, new positions for the representations 89 of the real vehicles 12 in the virtual race environment which is then presented to at the gaming device 2 to the player. In response, the gaming device generates at Step 162, gaming control data (virtual race commands) which are derived from the player's user inputs 38 to control their virtual vehicle. These virtual race commands are then compared to the output of a reference black box withing the virtual race simulation engine 36 and this is used to generate at Step 166, the subsequent positions of the virtual vehicle as a consequence of the player's user inputs. (It is to be appreciated that the real time black box generation in this embodiment is as has been described with reference to FIG. 10). This new position of the virtual vehicle can then be transmitted at Step 168, to the gaming server 4a and the position of other player's virtual vehicles 90 is received from and as determined relevant by the gaming server 4a. The new positions of the relevant virtual vehicles are then presented at Step 170, to the player on the gaming device 2. This process continues until the end of the race is determined at Step 172.

Finally, it should be clear that the features of the present invention can be extended to apply to a wide range of sporting events where the moving objects to be tracked within a delimited field of play and in real time are not motor vehicles but could for example be the players on a soccer pitch or basketball court or competitors in a downhill ski event or greyhounds on a racetrack. These are all examples of enactments areas which are not a track and moving entities which are not vehicles. The positional data capture system would be a tailored architecture of sensors, computing and communication equipment. Infra-red non-emitting fabric or small infra-red emitting devices (which can emit constant or modulated light and may possibly be triggered) can be incorporated into the real competitor's clothing providing cold or hot spots suitable for tracking and identification. Whilst the interactive competition of real players or teams and virtual players or teams may not be as practical as for motor sports, the immersive entertainment and viewing enhancements describe in 18) above are. The collection of sports statistics and analytics could be automated in a straightforward way. In addition, a soccer ball or basketball for example could be engineered to incorporate infra-red reflecting or non-emitting markers invisible to the human eye and the performance of the tracking devices would enable the spin on the ball to be measured continuously. This could also apply, for example, to the cue ball in a snooker or pool game with a single sensor positioned above the table. The common, distinguishing and novel feature is the tracking of moving objects (vehicles, players, balls, . . . ) over relatively short ranges (<100 m) using wide-angle infra-red sensors and illuminators and associated computing and communications equipment to detect passive or active infra-red markers, reflectors, absorbers or emitters. The real-time data so obtained is used to enhance a wide variety of interactive entertainment and gaming experiences.

Features of the present embodiments can be represented and described by the following clauses:

1) A system and method for the interaction of computer games players with live real races that involve real cars with drivers, or autonomous real cars is described, whereby a single player can start a race linking their simulated car with one of the real cars and progress either by remaining linked to the initial car or by linking from real car to real car based on defined proximity parameters, thereby competing as a virtual driver in a real race against the real drivers in a competitive manner.

2) A system and method are described whereby when the computer game player's simulated car is not linked to a real car all of the real cars appear in the race and the computer game player can by choice avoid the real cars, competing as an independent entity, or based on defined proximity parameters choose to link with a real car. When the player's simulated car is linked with a real car the real car does not appear as a competing car in the player's computer game.

3) A system and method are described whereby when the computer game player's car is linked with a real car the simulation of the game player's car is a digital twin of the real car, meaning that the performance of the game player's car in its environment is a sufficiently close simulation of the performance of the real car in its environment as to create a fair competition between the game player and the real driver or the autonomous car.

4) A system and method are described where the digital twinning is based on a dynamic, black box simulation of the highly accurate, measured kinematic performance of the real car in its environment and the inputs of the real driver to the real car.

5) A system and method are described whereby the computer game dynamically associates virtual zones with each real car such that when the car of the computer game player is in those zones it either becomes a digital twin of the real car or inherits specific performance characteristics related to the real car.

6) A system and method is described whereby when the computer game player's car is linked with a real car and the real car takes time out of the race for any maintenance or modification action (damage repair, refuelling, new tyres, . . . ) the computer game player can elect to take the same time out of the race (possibly delayed by 1 lap), in which case their simulated car inherits the changed performance characteristics of the real car.

7) A system or method is described whereby when the computer game player's car is not linked with a real car the computer game player can elect to take time out of the race for simulated maintenance or modification actions which on returning to the real race will qualify the computer game player's car to link with any real car that has had similar maintenance or modification actions.

8) A system and method are described whereby a number of computer game players, up to and including the number of real cars in the race, can link with the real cars throughout the race and thereby compete against each other as well as against the real cars in a single live real race.

9) A system and method is described for the mass interaction of large numbers of computer games players with live real races that involve real cars with drivers or autonomous real cars, whereby every player can start the race linking their simulated car with one of the real cars and progress by linking from real car to real car based on defined parameters, thereby competing as a virtual driver in a real race against the real drivers and all of the other computer game players in a competitive manner.

10) A system and method are described whereby the games players are competing in a massive esports race wherein it is required for each player to interact in a realistic, engaging and challenging manner with the real race and for there to be a fair method of ranking the very large number of players in terms of their performance and finishing position in the esports event and that method is based on the highly accurate positions of the simulated cars of the computer games players relative to each other.

11) A system or method are described whereby the interaction of the computer games players is with a recorded version of a previous race, the recording consisting of the highly accurate, measured kinematic performance of the real cars in the environment of the previous race and the inputs of the real drivers to the real cars throughout that race.

12) As an alternative, a system or method is described whereby the interaction of the computer games players is with a recorded version of a previous race, the recording consisting only of the highly accurate, measured kinematic performance of the real cars in the environment of the previous race. In this case the digital twinning is based on the digital record of the kinematic performance of the real cars in their environment combined with any other method that ensures that the simulated performance of the game player's car in its environment is a sufficiently close representation of the performance of the real car in its environment as to create a fair competition between the game player and the real driver or the autonomous car.

13) A system and method are described whereby when the computer game player's simulated car is substituted for a real car there is exchange of video, audio, or any other technical data in any direction and for any purpose between the computer system of the game player and the real car and/or its associated team and their facilities.

14) A system and method are described whereby each computer game player is allocated a handicap, based on a fair assessment of their previous experience and accumulated skills, and that handicap is used by the computer game to moderate the response of the car in its environment to the inputs of the player in such a way as to equalise approximately the chances of players of different levels of experience and skill competing with the real drivers in the real cars and/or competing against each other and winning the race.

15) A system and method are described whereby motor racing fans that are not computer game players can participate in an interactive viewing experience by linking to any number of the real cars and computer games player's cars at will using any of the methods described previously and receive technical data, video streams, audio streams or any of the other data involved in the systems and methods described previously.

16) A system and method are described in which virtual vehicles of gaming players can be associated with representations of real motorised vehicles and take as inputs positional data regarding real vehicles in a race and real driver inputs and use these to generate a reference black box representation against which gaming player inputs during a race can be assessed to determine a simulated gaming environment in which virtual player vehicles can be matched to representation of real vehicles to simulate a realistic racing environment.

17) A system and method are described in which the dynamic input and output data of real vehicles is captured and analysed using black-box modelling methods the results of which can be fed back in real time to the competing teams to assist their understanding of the performance of the driver and car in its environment and in particular to provide to the teams highly accurate kinematic data on the performance of their cars which to date has been impossible to obtain.

A system and method are described in which vehicle movement is sensed by groups of positional sensing devices positioned around a race track, each of the sensing devices includes an IR sensor for detecting IR radiation either emitted, reflected or transmitted from a vehicle to determine the vehicle's track position and a communications means for transmitting that positional data to a positional data capture system where data can be collated and provided as live positional data about a racing event involving those vehicles to a gaming device or server. However, it is to be appreciated that the movement tracking system is not limited to vehicle movement as has been described above. The accuracy of using groups of infra-red sensors with appropriate configuration and connections to other groups of infrared sensors enables accurate positional detection of moving bodies and can be applied for example to non-motorised sports involving the movement of humans or animals.

It is also to be appreciated that various modifications to the described embodiments are possible and elements of one embodiment can be combined with elements of other embodiments without difficulty. Accordingly, it is to be appreciated the methods and system described herein are non-liming examples of how different aspect of the present invention can be implemented and the present invention is to be determined by the spirit and scope of the present disclosure.

The invention claimed is:

1. A computer implemented method of controlling an interactive hybrid environment representing a motorized sporting event at a track, the interactive hybrid environment including representations of real and virtual vehicles on the track, the method comprising:
   receiving a stream of real sensor data, the real sensor data comprising:
      a. real kinematic data of a real vehicle on the track, the real kinematic data being captured by infra-red sensors at the track configured to detect infra-red radiation either emitted, reflected or transmitted from the real vehicle, wherein the detected infra-red radiation is processed to determine the kinematic data of the real vehicle, and
      b. real control data regarding the control of the real vehicle by a driver, the real control data being captured by vehicle sensors and obtained via telemetry systems from the real vehicle;
   determining the position and kinematic behaviour behavior of the representation of the real vehicle within the interactive hybrid environment using the real kinematic data;
   using the real control data and the real kinematic data to create a black box determination of the position of the real vehicle on the track based on the real control data, wherein the black box determination defines a transfer function of inputs to outputs;
   receiving a stream of computer-generated control data which is obtained by user interaction with a computer presenting the interactive hybrid environment to the user and capturing the user inputs to control kinematic behavior the representation of the virtual vehicle; and
   determining the position and kinematic behavior of the representation of the virtual vehicle within the interactive hybrid environment by using the black box determination and the computer-generated control data.

2. The computer implemented method of claim 1, wherein the real sensor data comprises real kinematic data of a plurality of real vehicles on the track and real control data regarding the control of each of the plurality of the real vehicles by a respective driver.

3. The computer implemented method of claim 2, wherein the real sensor data of each real vehicle of the plurality of the real vehicles includes a vehicle identifier.

4. The computer implemented method of claim 2, wherein the stream of computer-generated control data comprises a plurality of streams of computer-generated data, each stream being generated by a different user interaction with a respective computer and capture of the respective user inputs.

5. The computer implemented method of claim 4, wherein the stream of computer-generated control data of each of the plurality of streams of computer-generated data includes a computer device identifier.

6. The computer implemented method of claim 2, wherein the plurality of real vehicles is less than the plurality of streams of computer-generated data streams and the method further comprises linking a subset of the plurality of representations of virtual vehicles with a representation of one real vehicle to create a linked representation.

7. The computer implemented method of claim 6, further comprising using the linked representation to represent the subset of the plurality of representations of virtual vehicles within the interactive hybrid environment while the position of the virtual vehicle of the subset is within tolerance limits of the real vehicle.

8. The computer implemented method of claim 6, wherein the plurality of computer-generated data streams is a plurality of times larger than the plurality of real vehicles and the linking step comprises linking each of the plurality of computer-generated data to the plurality of representations of real vehicles in an even distribution.

9. The computer implemented method of claim 6, wherein the plurality of computer-generated data streams is a plurality of times larger than the plurality of real vehicles and the linking step comprises linking each of the plurality of computer-generated data to the plurality of representations of real vehicles in a logarithmic distribution.

10. The computer implemented method of claim 1, further comprising:
  updating the interactive hybrid environment with new positions of the representations of the real and virtual vehicles as determined by the received real sensor data and computer-generated data;
  generating the updated interactive hybrid environment; and
  broadcasting the updated interactive hybrid environment from a central server to a plurality of remotely located computers.

11. The computer implemented method of claim 1, further comprising:
  broadcasting the black box determination and the real sensor data from a central server to a plurality of remotely located computers;
  generating the interactive hybrid environment at each remotely located computer;
  updating the interactive hybrid environment with new positions of the representations of the real and virtual vehicles as determined by the received real sensor data and computer-generated data; and
  transmitting the new positions of the representations of the virtual vehicles to the central server.

12. The computer implemented method of claim 1, further comprising varying the association between the computer-generated control data and the resultant position of the virtual vehicle using an artificial intelligence engine, which references the black box determination.

13. The computer implemented method of claim 1, wherein the received real kinematic data comprises longitudinal positional data with respect to the track, lateral positional data with respect to the track and vehicle orientation data with respect to the track.

14. The computer implemented method of claim 1, wherein the real control data comprises one or more of steering wheel position, accelerator position, braking pedal position and gear selection of the real vehicle.

15. The computer implemented method of claim 1, further comprising retrieving the real sensor data from a data store which has stored copy of the real sensor data as the real sensor data was generated.

16. The computer implemented method of claim 1, wherein the receiving step comprises receiving the real sensor data substantially in real time as the sporting event is occurring.

17. The computer implemented method of claim 1, wherein the stream of real sensor data has a sampling rate of at least 25 Hz and the position of the real vehicle at a point in time is captured and provided to the interactive hybrid environment within 40 milliseconds of being captured.

18. The computer implemented method of claim 1, wherein the stream of real sensor data has a sampling rate of at least 60 Hz and the position of the real vehicle at a point in time is captured and provided to the interactive hybrid environment within 16.7 milliseconds of being captured.

19. The computer implemented method of claim 1, further comprising using stored data models to generate the interactive hybrid environment.

20. The computer implemented method of claim 1, further comprising receiving a stream of video data from the real vehicle and including the stream of video data in the interactive hybrid environment.

21. The computer implemented method of claim 1, further comprising receiving a stream of audio data from the real vehicle and including the stream of video data in the interactive hybrid environment.

22. The computer implemented method of claim 2, further comprising linking the representation of one of the virtual vehicles of the plurality of virtual vehicles to a representation of one of the real vehicles of the plurality of real vehicles at a point in time when the position of the representation of the virtual vehicle is within a predetermined threshold of the position of the representation of the real vehicle and using the representation of the real vehicle as the representation of the virtual vehicle in the interactive hybrid environment.

23. The computer implemented method of claim 22, further comprising receiving a stream of video data from the real vehicle and including the stream of video data in the interactive hybrid environment, wherein the linking step activates the provision of the received stream of audio or video data from the real vehicle to the computer presenting the interactive hybrid environment to the user.

24. The computer implemented method of claim 22, further comprising unlinking the representation of one of the virtual vehicles of the plurality of virtual vehicles with the representation of one of the real vehicles of the plurality of real vehicles at a point in time when the position of the representation of the virtual vehicle is outside the predetermined threshold of the position of the representation of the real vehicle and presenting the representation of the virtual vehicle separately to the representation of the real vehicle within the interactive hybrid environment.

25. The computer implemented method of claim 22, further comprising providing details of any virtual vehicle linked to a representation of the real vehicle to a remotely located third party computer.

26. The computer implemented method of claim 2, wherein each real vehicle has a set of performance characteristics and the method further comprises determining the closest positioned representation of a real vehicle of the plurality of real vehicles to the representation of the virtual vehicle and adopting the set of performance characteristics of the closest representation of the real vehicle as the performance characteristics of the virtual vehicle.

27. The computer implemented method of claim 1, further comprising capturing a positional data of the real vehicle on the track using said infra-red sensors, converting the positional data over time into the stream of real kinematic data and transmitting the same in real time to a central server.

28. The computer implemented method of claim 27, wherein the capturing step comprises capturing the positional data using groups of sensors monitoring different portions of the track, wherein each sensor in each group of sensors detects infra-red radiation either emitted, reflected or transmitted from the one or more vehicles operating on the track within a field of view (FOV) of the sensor.

29. The computer implemented method of claim 28, further comprising processing the infra-red radiation detected by the infra-red sensor to determine kinematic data of the one or more real vehicles operating on the track.

30. A computer system for controlling an interactive hybrid environment representing a motorized sporting event at a track, the interactive hybrid environment including representations of real and virtual vehicles on the track, the system comprising:
  a receiver for receiving a stream of real sensor data, the real sensor data comprising real kinematic data of a real vehicle on the track and real control data regarding the control of the real vehicle by a driver, the real kinematic data being captured by infra-red sensors at the track configured to detect infra-red radiation either emitted, reflected or transmitted from the real vehicle, wherein the detected infra-red radiation is processed to determine the kinematic data of the real vehicle, and the real control data being captured by vehicle sensors and obtained via telemetry systems from the real vehicle;
  a virtual race command processor configured to receive a stream of computer-generated control data which is obtained by user interaction with a computer presenting the interactive hybrid environment to the user and capturing the user inputs to control kinematic behaviour the representation of the virtual vehicle; and
  a virtual race simulation engine including:
    a race simulation output engine for determining the position and kinematic behaviour of the representation of the real vehicle within the interactive hybrid environment using the real kinematic data;
    a reference black box model generator configured to use the real control data and the real kinematic data to create a black box determination of the position of the real vehicle on the track based on the real control data, wherein the black box determination defines a transfer function of inputs to outputs; and
    a gaming black box implementing engine configured to determine the position and kinematic behaviour of the representation of the virtual vehicle within the interactive hybrid environment by using the black box determination and the computer-generated control data.

31. The computer system of claim 30, further comprising an artificial intelligence engine which is configured to vary the association between and the resultant position of the virtual vehicle.

32. The computer system of claim 31, wherein the artificial intelligence engine is configured to broaden thresholds required of the received computer-generated control data to generate a given position of the virtual vehicle.

* * * * *